US012426005B2

(12) United States Patent
Ashraf et al.

(10) Patent No.: US 12,426,005 B2
(45) Date of Patent: Sep. 23, 2025

(54) INDICATION OF POSITIONING RELATED INFORMATION

(71) Applicant: Nokia Technologies Oy, Espoo (FI)

(72) Inventors: Muhammad Ikram Ashraf, Espoo (FI); Diomidis Michalopoulos, Munich (DE); Hyun-Su Cha, Oak Park, IL (US); Ryan Keating, Chicago, IL (US); Tao Tao, Shanghai (CN); Shi Ming Zhang, Shanghai (CN); Li Yu Cai, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/997,540

(22) PCT Filed: Aug. 1, 2022

(86) PCT No.: PCT/CN2022/109357
§ 371 (c)(1),
(2) Date: Jan. 22, 2025

(87) PCT Pub. No.: WO2024/026601
PCT Pub. Date: Feb. 8, 2024

(65) Prior Publication Data
US 2025/0234327 A1 Jul. 17, 2025

(51) Int. Cl.
H04W 76/20 (2018.01)
H04L 5/00 (2006.01)
H04W 64/00 (2009.01)

(52) U.S. Cl.
CPC ........... *H04W 64/00* (2013.01); *H04L 5/0051* (2013.01); *H04W 76/20* (2018.02)

(58) Field of Classification Search
CPC ....... H04W 64/00; H04W 92/18; H04W 4/40; H04W 72/25; H04W 76/14; H04W 4/02;
(Continued)

(56) References Cited

U.S. PATENT DOCUMENTS

2010/0232543 A1 9/2010 Sampath et al.
2017/0265092 A1* 9/2017 Liu .................... H04W 24/02
(Continued)

FOREIGN PATENT DOCUMENTS

CN 110536229 A 12/2019
WO 2011017953 A1 2/2011
(Continued)

OTHER PUBLICATIONS

International Search Report issued by the National Intellectual Property Administration, PRC acting as the International Searching Authority in relation to International Application No. PCT/CN2022/109357 dated Dec. 23, 2022 (3 pages).
(Continued)

*Primary Examiner* — Joseph Arevalo
(74) *Attorney, Agent, or Firm* — Carter, DeLuca & Farrell LLP

(57) ABSTRACT

Embodiments of the present disclosure relate to devices, methods, apparatuses and computer readable storage media for implicit indication of positioning related information. A first device selects a reference signal (RS) sequence from a plurality of available RS sequences. Based on the selected RS sequence, the first device generates a RS for positioning and then transmits the generated RS to a second device to indicate, with the selection of the reference signal sequence, at least part of side information related to the positioning.

3 Claims, 13 Drawing Sheets

(58) Field of Classification Search
CPC ....... H04W 4/70; H04W 52/24; H04W 52/28; H04W 52/32; H04W 64/006; H04W 72/0473; H04W 72/20; H04W 76/11; H04W 76/50; H04W 8/22
USPC ... 455/456.1, 456.6, 456.2, 522, 437, 452.3, 455/450, 226.4, 502
See application file for complete search history.

(56) References Cited

U.S. PATENT DOCUMENTS

| | | | |
|---|---|---|---|
| 2023/0199701 A1* | 6/2023 | Cheema | H04L 5/0094 455/456.1 |
| 2024/0107356 A1* | 3/2024 | Yerramalli | H04W 24/10 |
| 2024/0224219 A1* | 7/2024 | Lee | G01S 5/0018 |
| 2024/0314609 A1* | 9/2024 | Manolakos | G01S 5/0036 |
| 2024/0340838 A1* | 10/2024 | Manolakos | G01S 5/02 |
| 2024/0349097 A1* | 10/2024 | Kazmi | H04W 48/16 |
| 2025/0024300 A1* | 1/2025 | Zheng | H04B 17/364 |
| 2025/0056469 A1* | 2/2025 | Priyanto | G01S 5/06 |
| 2025/0088883 A1* | 3/2025 | Rao | G01S 5/0072 |
| 2025/0110198 A1* | 4/2025 | Barbu | G01S 5/0236 |
| 2025/0151010 A1* | 5/2025 | Hoang | H04L 5/0051 |
| 2025/0151012 A1* | 5/2025 | Rao | G01S 5/0268 |
| 2025/0159652 A1* | 5/2025 | Kumar | H04L 5/0044 |

FOREIGN PATENT DOCUMENTS

| | | |
|---|---|---|
| WO | 2011035517 A1 | 3/2011 |
| WO | 2021160796 A1 | 8/2021 |

OTHER PUBLICATIONS

Written Opinion of the International Searching Authority issued by the National Intellectual Property Administration, PRC acting as the International Searching Authority in relation to International Application No. PCT/CN2022/109357 dated Dec. 23, 2022 (3 pages).

* cited by examiner

INDICATION OF POSITIONING RELATED INFORMATION

CROSS-REFERENCE TO RELATED APPLICATIONS

This application is a national phase entry under 35 U.S.C. 371 of PCT International Application No. PCT/CN2022/109357 filed Aug. 1, 2022, the disclosure of this application is expressly incorporated herein by reference in its entirety.

FIELD

Embodiments of the present disclosure generally relate to the field of telecommunication and, in particular, to devices, methods, apparatuses and computer readable storage media for indicating positioning related information.

BACKGROUND

Positioning is an important aspect in wireless communications, especially, for New Radio (NR). Various positioning techniques may be adopted which may be based on Downlink Time Difference of Arrival (DL-TDOA), Uplink Time Difference of Arrival (UL-TDOA), Downlink Angle of Departure (DL-AoD), Uplink Angle of Arrival (UL-AoA), Multi-cell Round Trip Time (Multi-RTT) and the like. Positioning enhancement is a big concern in NR which is focusing on increasing accuracy, reducing latency and increasing efficiency such as low complexity, low power consumption and low overhead.

For positioning enhancement, positioning support is required for Reduced Capability (RedCap) devices that are designed with relatively longer battery life as compared to Internet of Things (IoT) devices. Moreover, low power high accuracy positioning (LPHAP) is another objective for positioning enhancement.

SUMMARY

In general, example embodiments of the present disclosure provide devices, methods, apparatuses and computer readable storage media for indicating positioning related information.

In a first aspect, there is provided a first device. The first device comprises at least one processor; and at least one memory storing instructions that, when executed by the at least one processor, cause the first device at least to: select a reference signal sequence from a plurality of available reference signal sequences; generate, based on the selected reference signal sequence, a reference signal for positioning; and transmit, to a second device, the generated reference signal to indicate, with the selection of the reference signal sequence, at least part of side information related to the positioning.

In a second aspect, there is provided a second device. The second device comprises at least one processor; and at least one memory storing instructions that, when executed by the at least one processor, cause the second device at least to: receive a reference signal from a first device; detect, from a plurality of available reference signal sequences, a reference signal sequence used by the first device to generate the reference signal; and determine, based on the detection of the reference signal sequence, at least part of side information related to positioning.

In a third aspect, there is provided a third device. The third device comprises a at least one processor; and at least one memory storing instructions that, when executed by the at least one processor, cause the third device at least to: receive a report from a first device for associations of a plurality of available reference signal sequences and a plurality of available identifications of timing error groups; and maintain mapping between the plurality of available reference signal sequences, the plurality of available identifications of timing error groups and a plurality of margins of timing error groups.

In a fourth aspect, there is provided a method implemented at a first device. The method comprises selecting a reference signal sequence from a plurality of available reference signal sequences; generating, based on the selected reference signal sequence, a reference signal for positioning; and transmitting, to a second device, the generated reference signal to indicate, with the selection of the reference signal sequence, at least part of side information related to the positioning.

In a fifth aspect, there is provided a method implemented at a second device. The method comprises receiving a reference signal from a first device; detecting, from a plurality of available reference signal sequences, a reference signal sequence used by the first device to generate the reference signal; and determining, based on the detection of the reference signal sequence, at least part of side information related to positioning.

In a sixth aspect, there is provided a method implemented at a third device. The method comprises receiving a report from a first device for associations of a plurality of available reference signal sequences and a plurality of available identifications of timing error groups; and maintaining mapping between the plurality of available reference signal sequences, the plurality of available identifications of timing error groups and a plurality of margins of timing error groups.

In a seventh aspect, there is provided an apparatus comprising means for performing the method according to the above fourth, fifth or sixth aspect.

In an eighth aspect, there is provided a non-transitory computer readable medium comprising program instructions for causing an apparatus to perform at least the method according to any one of the above fourth to sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
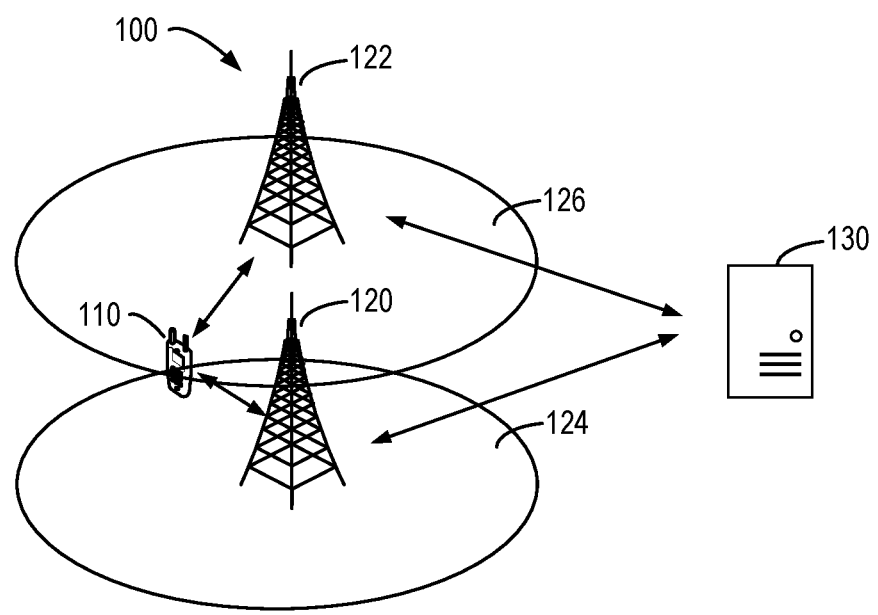
FIG. 1 illustrates an example environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry), and (b) combinations of hardware circuits and software, such as (as applicable):

(i) a combination of analog and/or digital hardware circuit(s) with software/firmware, and (ii) any portions of hardware processor(s) with software (including digital signal processor(s), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable communication protocols, including, but not limited to, cellular communication protocols such as the first generation (1G), the second generation (2G), 2.5G, 2.75G, the third generation (3G), the fourth generation (4G), 4.5G, the fifth generation (5G) cellular communication protocols, wireless local network communication protocols such as Institute for Electrical and Electronics Engineers (IEEE) 802.11 and the like, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be understood that the scope of the present disclosure will not be limited to only the aforementioned system.

As used herein, the term "base station" or (BS) refers to a device in a communication network via which a terminal device accesses the network and receives services therefrom. The base station may include a transmission/reception point (TRP), an access point (AP), a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto node, a pico node, an access point, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In some example embodiments, the terminal device may be a Reduced Capability (RedCap) device. In the following description, the terms "terminal device", "communication device", "terminal", "user equipment" and "UE" may be used interchangeably.

As used herein, the term "location device" refers to a device that provides positioning-related services to a terminal device. The location management service may include location update and tracking and other positioning-related service of the terminal device. An example of the location device is a location management function (LMF). It could also be referred to as positioning engine. The location device may be implemented by a device physically separate from or integrated into a base station. In the following description, the term "location device" may also be referred to as a location server.

As used herein, the term "reference signal" refers to a signal transmitted from a base station to a terminal device (DL) or from a terminal device to a base station (UL) for the positioning purpose. Based the measurements of the reference signal (also referred to as RS measurements), a location of the terminal device can be determined using various positioning techniques such as Downlink Time Difference of Arrival (DL-TDOA), Uplink Time Difference of Arrival (UL-TDOA), Downlink Angle of Departure (DL-AoD), Uplink Angle of Arrival (UL-AoA), Multi-cell Round Trip Time (Multi-RTT), RF fingerprinting, database matching, and the like. In addition, various artificial intelligence based position algorithms can be used based on RS measurements.

FIG. 1 illustrates an example environment 100 in which example embodiments of the present disclosure may be implemented.

The environment 100, which may be a part of a communication network, includes a terminal device 110, a serving base station 120 and a neighboring base station 122. The serving base station 120 serves an area (also referred to as a cell) 124 and is serving the terminal device 110 in the area 124. The neighboring base station 122 is close to the serving base station 120 and serves an area 126 adjacent to the area 124 of the serving base station 120.

The environment 100 further includes a location device 130 that provides positioning-related services to the terminal device 110. For example, the location device 130 may track a location of the terminal device 110, identify a movement state (for example, slow movement or fast movement) of the terminal device 110, or the like. In some example embodiments, the location device 130 may determine the location of the terminal device 110 based on the positioning-related measurements from the serving base station 120 and the neighboring base station 122 for the terminal device 110.

It is to be understood that the numbers of terminal devices, base stations and location devices are shown in FIG. 1 only for the purpose of illustration without suggesting any limitations. The environment 100 may comprise any suitable number of terminal devices, base stations and location devices adapted for implementing example embodiments of the present disclosure.

It is also to be understood that the location device 130 is shown to be physically separate from the base stations 120 and 122 only for the purpose of illustration. The location device 130 may be implemented by a physical or virtual device. The location device 130 may be implemented as a hardware, firmware and/or algorithm-based software component within any of the network nodes (such as the terminal device 110, the base station 120 or 122, or the like) to which the relevant information or measurements are made available. In some example embodiments, the location device 130 may be physically integrated into or a part of the base station 120 or 122.

The terminal device 110 may communicate with the base stations 120 and 122 or with the location device 130 directly or via the base station 120 or 122. Communications between the terminal device 110 and the base stations 120 and 122 and the location device 130 may utilize any suitable wireless communication technology, including, but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future. The location device 130 may communicate with either one or both of the base stations 120 and 122 in a wireless or wired way.

In the positioning of the terminal device 110, the terminal device 110 may periodically transmit a reference signal (RS) such as a sounding reference signal (SRS) or a positioning reference signal (PRS). The serving base station 120 and the neighboring base station 122 may detect the RS and report the RS measurements to the location device 130. Moreover, the terminal device 110 may detect a RS such as a positioning reference signal (PRS) from the base station 120 and the base station 122 and reports the corresponding measurements to the location device 130. Based on these measurements, the location device 130 may determine a location of the terminal device 110 based on a positioning technique such as DL-TDOA, UL-TDOA, DL-AoD, UL-AoA, Multi-RTT or the like.

Optimal transmission and reception of RS sequences may depend on accuracy requirements, capabilities, various hardware and software related errors, and possibly also on backward compatibility requirements, for example, if a receiver is accustomed to measuring certain sequences. Moreover, when changing accuracy and/or energy consumption, periodicity or other configurations of RSs may be adapted, and the receiver needs to know this.

However, if such adaptation is all transmitted over the network, using some designated signalling field or some designated time-frequency resource, significant communication overhead may be incurred. In particular, for low power devices (such as a RedCap device) or LPHAP use cases, this may become a big issue as such transmissions may severely waste UE power consumption. In addition, it may not be possible to find a suitable signalling field without changing also other signalling fields or frame structures. Thus, it may be difficult or impossible to add position related information, e.g., to an existing wireless system in a backward compatible manner.

Embodiments of the present disclosure propose a power efficient mechanism of implicitly conveying the position-related information. Instead of separately sending a RS and other position-related information such as a TEG error and a changed transmission periodicity of the RS, this mechanism combines a RS transmission and transmission of at least part of pertinent side information for the positioning purpose in a single transmission or without a need for additional time-frequency resources such as time slot and/or frequency slots and/or bandwidth. With the mechanism, a device (referred to as a first device) selects a RS sequence from a plurality of available RS sequences to implicitly indicate the side information for positioning.

The side information may be determined at least in part by the first device. For example, the side information may comprise additional information based on determined hardware or software processing latencies and/or delays of the first device. Alternatively or in addition, the addition information may be based on energy or capability constraints of the first device. The side information may be related to various use cases, or to combinations thereof. For example, the side information may be used to implicitly indicate TEGs, a RS periodicity or how RSs are multiplexed and/or sampled when the transmission periodicity of the RSs changes.

After a further device (referred to as a second device) receives a RS generated from the selected RS sequence, the second device determines or derives the side information based on the selection or detection of the RS sequence from the plurality of available RS sequences. Further, the second device may use the side information to improve subsequent position-related processing to improve at least one of overall energy efficiency or positioning accuracy.

In this way, energy saving may be improved at both transmitting and receiving sides. Moreover, signals transmitted over an air interface may be reduced to achieve compact over-the-air signaling and thus to increase signaling efficiency and further network resource efficiency. In addition, low complex implementation is needed which may be more suitable for RedCap UEs.

Figure 2:
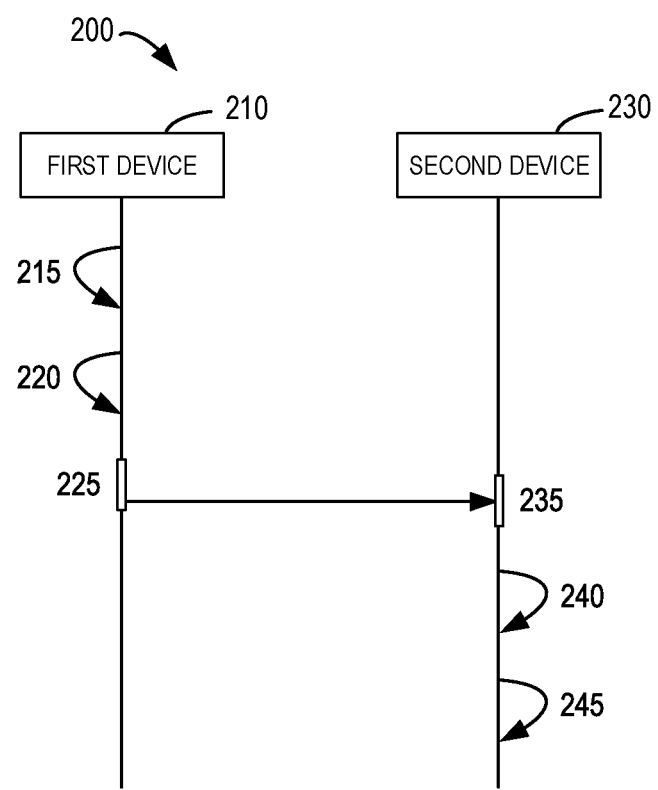
FIG. 2 illustrates a high-level diagram of a process for implicitly conveying the side information for the positioning purpose according to some example embodiments of the present disclosure.

FIG. 2 shows a high-level diagram of a process 200 for implicitly conveying the side information for the positioning purpose according to some example embodiments of the present disclosure.

In the process 200, a first device 210 (such as the terminal device 110 in FIG. 1) selects (215) a RS sequence from a plurality of available RS sequences. Based on the selected RS sequence, the first device 210 generates (220) a RS for positioning. Then, the first device 210 transmits (225) the generated RS to a second device 230 (such as the base station 120 or 122 in FIG. 1). With the selection of the RS sequence from the available RS sequences, the first device 210 indicates, to the second device 230, at least part of the side information associated with the selected RS sequence for the positioning purpose.

The available RS sequences may be configured by the network and indicated by the second device 230. For example, the first device 210 may receive from the second device 230 an indication of the available RS sequences such as identifications (IDs) of these RS sequences. These available RS sequences may be configured for a RS resource. Thus, a RS generated based on different RS sequences of the available RS sequences may be transmitted using the same RS resource.

After the second device 230 receives (235) the RS from the first device 210, the second device 230 detects (240) the RS sequence selected by the first device 210 from the available RS sequences. The second device 230 determines (245) the associated side information based on the selection of the RS sequence. Using the side information, the second device 230 may perform the subsequent positioning operations. For example, in the example embodiments where the first device 210 is implemented by the terminal device 110 in FIG. 1 and the second device 230 is implemented by the base station 120 or 122 in FIG. 1, the second device 230 may obtain and report the RS measurements pertinent to a particular positioning method and/or the determined side information to the location device 130 as shown in FIG. 1 for positioning the first device 210.

It is to be understood that the first device 210 and the second device 230 may be implemented by any suitable devices in a communication network. In some example embodiments, the first device 210 may be implemented by the base station 120, and the second device 230 may be implemented by the terminal device 110. In this example, the RS may be a DL RS such as PRS. Based on the DL RS measurements, the second device 230 may be positioned. For the purpose of discussion, some example embodiments of the present disclosure will be discussed by taking the terminal device 110 as an example of the first device 210 and the base station 120 or 122 as an example of the second device 230.

The mechanism of implicitly conveying the position-related side information may be applied in any suitable use case. In some example embodiments, this mechanism may be used in TEG error reporting for positioning enhancement. Some example embodiments related to the TEG error reporting will be discussed below.

Example Use Case One: TEG Error Reporting

In addition to the RS measurements, other positioning related information may be needed for the positioning. In some example embodiments, transmission (Tx)/reception (Rx) timing errors may be considered for the positioning. The Tx timing error may represent a calibrated or uncalibrated time delay from the time when a digital signal is generated at a baseband (BB) to the time when a Radio Frequency (RF) signal is transmitted from a Tx antenna. The Rx timing error may represent a calibrated or uncalibrated time delay from the time when the RF signal arrives at the Rx antenna to the time when the signal is digitized and time-stamped at the BB.

In order to meet an objective of low complexity, low power consumption and low overhead (3 L) to enhance positioning, timing error group (TEG) errors instead of the Tx/Rx timing errors may be reported from the terminal device 110 to the base stations 120 and 122 and further to the location device 130 for the positioning purpose. The TEG may represent the group delays between the BB and the antennas at a device (such as UE or gNB). The group delays may be time varying and depend on the specific part or paths (analog and digital paths), such as the specific panel or RF chain, frequency or temperature and other calibration errors. Two transmissions or receptions in the same RF chain/panel/frequency and near in time may have very similar group delays. Each TEG may have an associated identification (ID) which may also be referred to as a TEG ID. If two RS measurements have the same TEG, then the two RS transmissions may be assumed (within a certain margin) to suffer from the same timing error which is applicable to both Tx and Rx side in both DL and UL measurements.

The timing errors may impact the positioning accuracy. For example, for UL-TDOA, uplink relative time of arrival (RTOA) measurements may be impacted by the UE Tx TRP Rx timing errors. For Multi-RTT, UE and gNB Rx-Tx time difference measurements may be impacted by the UE and TRP Tx/Rx timing errors respectively. For positioning enhancement, the UE Tx TEG error may be reported to an LMF.

A UE Tx TEG may be associated with the transmissions of one or more UL SRS resources for the positioning purpose. A specific SRS resource may be associated with a specific UE Tx TEG. The UE may report the Tx TEG association of SRS resources to the gNB and/or LMF in Radio Resource Control (RRC) signaling. The UE may determine the TEG for each SRS resource transmission. Moreover, the UE may have flexibility to transmit an SRS resource with different Tx TEG, for example, using another antenna panel. In this case, the UE may need to keep updating the association information to the gNB and/or LMF. For example, whenever the UE Tx TEG association is changed, the UE may need to report such a change. This may require large overhead, particularly, in mobility scenarios. Alternatively, or in addition, the gNB may request the UE to report the Tx TEG association information between UE Tx TEG IDs and SRS resources periodically which may be consume large resources and signaling overhead.

Moreover, the UE may need to report Tx TEG association information for all of SRS resources whenever the UE reports UE Rx-Tx time difference measurements. This operation becomes even more problematic at frequency range 2 (FR2) where the UE may be beamforming and configured with multiple SRS resources within one SRS resource set. Frequency range 1 (FR1) and FR2 refers to two frequency ranges where FR1 covers 450 MHz to 6 GHz (also called Sub6G) and FR2 covers 20 GHz to 52 GHz (also called mmWave). Specifically, in the case that the UE is configured with MIMO and uses multiple Tx chains to transmit the SRS eventually utilizing multiple Tx TEG IDs, the report for changes of UE Tx TEG association is challenging, particularly for RedCap positioning. Further, for the same SRS resources, the associated Tx TEG may change during a positioning session due to UE mobility. There may be a need to further optimize the Tx TEG reporting in terms of signaling and resource efficiency.

Furthermore, margins of the TEG (also referred to as TEG margins) may be fixed or be declared by the UE as a part of UE capability signaling. The UE may need to report these TEG margins to the gNB and/or LMF, for example, using RRC signaling. In addition, to reduce the over-the-air (OTA) signals, it may be appropriate to use as few signals as possible and use the existing signals to report such errors. Additional resources may be needed, on top of the resources needed for reference signals (SRS), for reporting the UE Tx TEG error measurements using RRC signaling.

In order to reduce the cost of the TEG error reporting, in some example embodiments, a RS sequence may be associated with a TEG ID and/or a TEG margin. In these example embodiments, the selection of the RS sequence may implicitly indicate the associated TEG ID and/or TEG margin as the side information for the positioning purpose.

Figure 3:
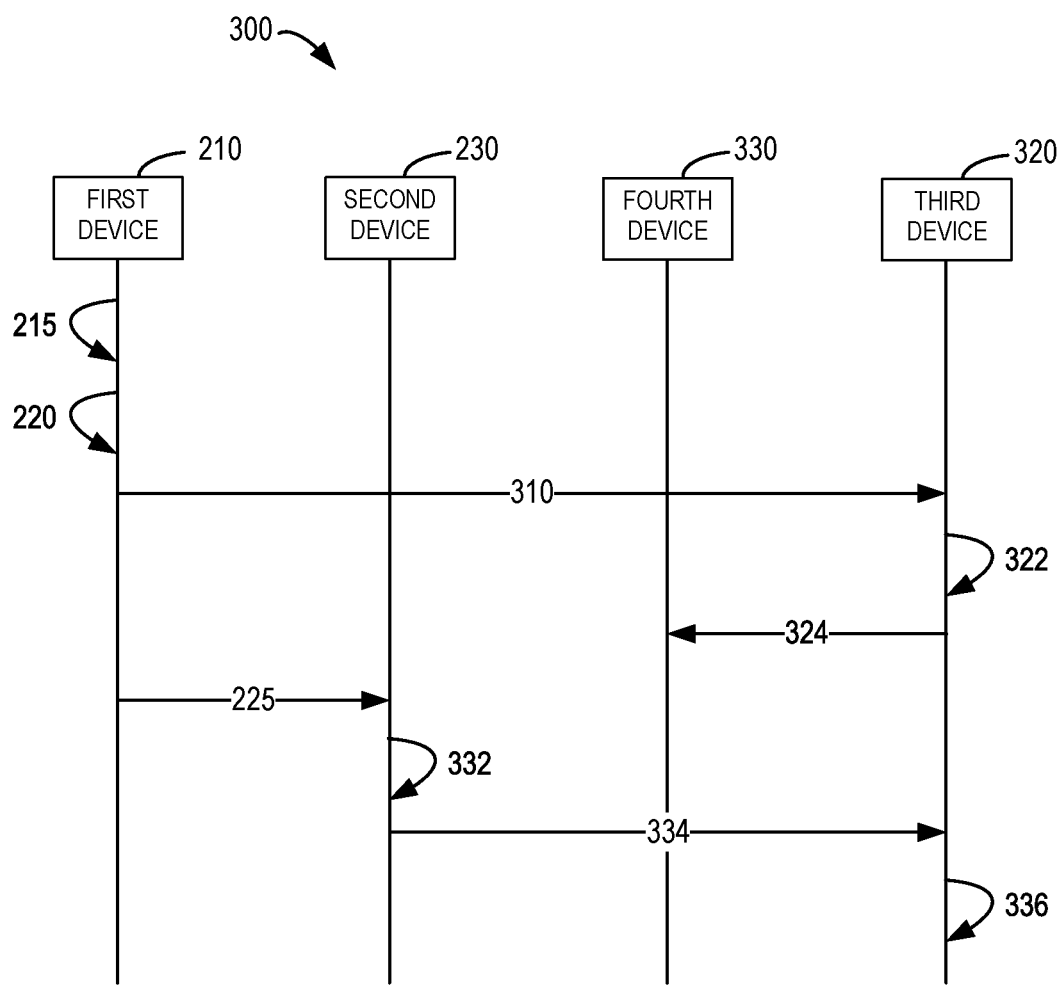
FIG. 3 illustrates a flowchart of an example process of the TEG error reporting according to some example embodiments of the present disclosure.

FIG. 3 shows an example process 300 of the TEG error reporting according to some example embodiments of the present disclosure.

In the process 300, the actions or operations at 215, 220 and 225 are similar to the corresponding actions or operations in the process 200 as shown in FIG. 2. The embodiments as discussed above with reference to FIG. 2 are likewise applicable to the process 300 and have similar effects. For the purpose of simplification, the details will be omitted.

As shown in FIG. 3, after the selection (215) of the RS sequence from the plurality of available RS sequences, the first device 210 may transmit (225) the RS to indicate, with the selection of the RS sequence, the associated TEG ID and/or TEG margin to the second device 230 as the positioning related side information.

In this way, the RS and associated TEG ID and/or TEG margin may be combined in a single transmission. Accordingly, the cost of reporting the TEG errors may be reduced without degradation of the positioning accuracy. This is more beneficial for low power devices (such as RedCap UEs) and/or an LPHAP objective. The resources or signaling overhead and power consumption may be saved for positioning measurements.

Moreover, as discussed above, if the first device 210 associates SRS resources with TEG IDs, when the first device 210 changes a TEG for a specific SRS resource, the first device 210 may need to update the association information. According to some example embodiments of the present disclosure, based on the association between the TEG ID and the RS sequence, the first device 210 may not need to report the update of association information.

As a result, instead of sending separately the RS and the TEG margin measurement, the RS with the special sequence may indicate the estimated TEG margin measurement. Both TEG margin estimation and TEG ID association reporting procedures may be employed for the first device 210. Thus, the first device 210 may dynamically adapt the positioning transmission based on the expected TEG margin.

In some example embodiments, the first device 210 may ignore some of the TEG reporting if it is not required based on the historical TEG reporting. For example, the first device 210 may use the same sequence if the expected TEG error is the same as the previously reported TEG error. This may further reduce the complexity of the operations at both the transmitting and receiving sides.

In some example embodiments, the association may be generated between the TEG ID, the TEG margin and the RS sequence. For example, the first device 210 may determine (or estimate) a TEG margin and associate it to a TEG ID. The TEG ID may be then associated to a dedicated RS sequence to represent the desired or expected TEG margin. In these example embodiments, before the selection, the first device 210 may determine the distribution of a TEG margin and then determine the mean and variance of the TEG margin reported to the second device 230. Accordingly, the first device 210 may determine a TEG ID based on the supported TEG IDs (such as the number of antenna panel), the capability of the terminal device 110 and previously reported TEG IDs. The first device 210 may use the dedicated RS sequence for the TEG.

In order to associate the TEG margin with the TEG ID, in some example embodiments, a plurality of associations may be generated between a plurality of available TEG IDs and a plurality of TEG margins. These associations may be determined based on granularity of the TEG error. The granularity of the TEG error may be determined based on the number of available RS sequences and a margin offset for the plurality of available TEG IDs (also referred to as a TEG margin offset). In some example embodiments, the associations of the TEG IDs and TEG margins may be generated based on the number of RS sequences and the margin offset, directly or by means of other intermediate factors than the granularity of the TEG error.

For the calculation of the granularity, for example, based on the positioning accuracy requirements, the first device 210 or the second device 220 may determine the number of RS sequences required for TEG margin indications and the TEG margin offset (represented by a delta value $\Delta_v$ of the TEG margin measurement) to be indicated with RS sequences. The determining may also be implemented by other devices in the network such as the second device 230, and the determining result may be indicated to the first device 210.

The delta value $\Delta_v$ may be both negative or positive and can be calculated per device (for example, specific to the first device 210) or set of devices (including the first device 210). If the second device 230 determines the delta value, the second device 230 may configure the delta value to the first device 210. For example, the second device 230 may configure the maximum and minimum values of the delta value, or configure the maximum value of the delta value, the RS sequences, and the granularity G.

As an example, if the second device 230 configures the first device 210 with the number of RS sequences NRS and the maximum value of the delta value, then the first device 210 may determine the granularity $$G = \frac{|\max \Delta_v - \min \Delta_v|}{N_{RS}}. \text{ If } \min \Delta_v = 0, \text{ then } G = \frac{|\max \Delta_v|}{N_{RS}}.$$

The RS sequences may be used to indicate different TEG margins and may be used to track the delta value over time.

Table 1 shows an example association of SRS sequences to expected UE TEG Tx errors as below.

TABLE 1

| TEG ID | SRS sequence mapping | UE TEG Tx Margin |
|---|---|---|
| 1 | SRS sequence #1 | 5 ns |
| 2 | SRS sequence #2 | 10 ns |
| 3 | SRS sequence #3 | 15 ns |
| ... | ... | ... |
| N | SRS sequence #n | [X]ns |

As shown in Table 1, each TEG ID is associated with an SRS sequence and has a TEG error granularity 5 ns.

In some example embodiments, prior to selecting (215) the RS sequence from the available RS sequences as shown in FIG. 3, the first device 210 may cause the association of the RS sequence and the at least one of the TEG ID or the TEG margin. In some example embodiments, the association may be generated by the second device 230. For example, the first device 210 may request the second device 230 to generate the association.

In some example embodiments, a plurality of associations may be generated between the plurality of available RS sequences and a plurality of available TEG IDs. In these example embodiments, the first device 210 may request the second device 230 for the associations. As an example of this request, the first device 210 may send to the second device 230 an indication of the plurality of available TEG IDs to request for RS sequences associated with respective ones of the TEG IDs. As a response, the second device 230 may generate the associations and transmit an indication of the associations to the first device 210.

By way of example, to cause the second device 230 to generate the associations of the TEG IDs and the RS sequences, the first device 210 may report how many TEGs will be used for RS transmission, and the first device 210 requests for dedicated RS sequences that will be used for each TEG ID. The second device 230 may determine the TEG IDs associated with the RS sequences. Then, the second device 230 may provide confirmation of the association request on TEG IDs and the RS sequences to the first device 210.

In some example embodiments, as a response to the request from the first device 210, the second device 230 may transmit to the first device 210 a plurality of root indexes to generate RS sequences for the plurality of available TEG IDs. Using the root index, the first device 210 may generate the plurality of available RS sequences to be associated with the plurality of available TEG IDs.

The root index may be used to generate any suitable form of sequences. As an example, the root index may be a dedicated root-index of Zadoff-Chu sequence. In this example, the second device 230 may allocate a dedicated root-index of Zadoff-Chu sequence to generate dedicate sequence for each TEG ID. Accordingly, the first device 210 may generate a sequence using a configured root-index associated with a TEG ID. The number of sequences generated for the TEG may be based on the granularity of the TEG error and quality of service (QOS) for positioning.

In the example embodiments where the association between the TEG ID, the TEG margin and the RS sequence is generated, this association may also be generated by the second device 230. For example, the first device 210 may determine the TEG ID and TEG margin based on its capability and previously reported TEG IDs and TEG margins. Then, the first device 210 may request to the second device 230 for the association between the TEG ID and a RS sequence. Further, the second device 230 may generate the RS sequence based on the TEG ID and TEG margin reported by the first device 210.

In some example embodiments, the first device 210 may generate the associations of the plurality of available RS sequences and TEG IDs. For example, the first device 210 may map the TEG IDs with specific RS sequences. The first device 210 may try to use and/or assign different RS sequences dedicated to each TEG ID.

The generation of the associations at the first device 210 may be triggered upon an instruction from the second device

230. For example, the second device 230 may send an instruction to the first device 210 to configure the TEG-ID and RS-sequence mapping based on the expected Tx TEG margin. Then, the first device 210 may determine the associated TEG-IDs with RS sequence to generate the association between TEG IDs and RS sequences considering the TEG margin (as shown in Table 1).

In some example embodiments, as shown in FIG. 3, the first device 210 may report (310) the generated associations to a third device 320 for the positioning. The third device 320 may be the location device 130 as shown in FIG. 1 or any suitable device capable of positioning in the communication network. It is to be understood that the third device 320 is shown to be different from or physically separate from the second device 230 only for the purpose of illustration, without suggesting any limitation. In some example embodiments, the third device 320 may be integrated into or even the same as the second device 230.

In the example embodiments where the third device 320 is implemented by the location device 130 and the first device 210 is implemented by the terminal device 110 as shown in FIG. 1, the first device 210 report the association information between TEG-ID and RS sequence information to the third device 320 via Long Term Evolution (LTE) Positioning Protocol (LPP).

The third device 320 may maintain (322) the information related to the mapping between Tx TEG ID, sequence association and TEG margin, for example, as shown in Table 1. In some example embodiments, the third device 320 may transmit (324) an indication of the association information between Tx TEG-IDs and the RS sequences to a fourth device 330 (such as the neighboring base station 122 as shown in FIG. 1) over New Radio Positioning Protocol a (NRPPa).

After the first device 210 performs the RS transmission (at 225), the second device 230 may perform the RS measurements (at 332). The second device 230 may transmit (334) the RS measurements and their associated TEG ID, RS sequence to the third device 320 for the positioning, for example, over NRPPa. Then, the third device 320 may determine (336) the positioning by considering the TEG ID and their associate RS sequence and margin.

For example, the third device 320 may receive, from the second device 230, a measurement (referred to as a first measurement) of a RS as well as at least one of a RS sequence, or ID thereof, of the plurality of available RS sequences or a TEG ID of the plurality of available TEG IDs. The third device 320 may determine a TEG margin of the plurality of TEG margins associated with the at least one of the RS sequence or the TEG. Based on at least the first measurement and the determined TEG margin, the third device 320 may determine a position of the first device 210.

In some example embodiments, the third device 320 may receive, from the fourth device 330, a further measurement (referred to as a second measurement) of the RS and at least one of the RS sequence for generating the RS or the TEG ID. In these example embodiments, the third device 320 may perform the positioning of the first device 210 further based on the second measurement.

In the example embodiments where the first device 210 may be implemented by the terminal device 110 as shown in FIG. 1, the first device 210 may be configured to transmit the RS in the inactive (or idle) mode such as a RRC inactive or idle mode. The TEG error reporting procedure as discussed above with reference to FIG. 3 is also applicable in this case. Thus, the first device 210 may not need to have SDT capability or move to a connected state (such as a RRC connected state) in order to support the TEG margin reporting, for example, simply to transmit TEG association information, which may be a large burden for the first device 210.

Example processes of the TEG error reporting will be discussed below with reference to FIGS. 4A and 4B.

Figure 4A:
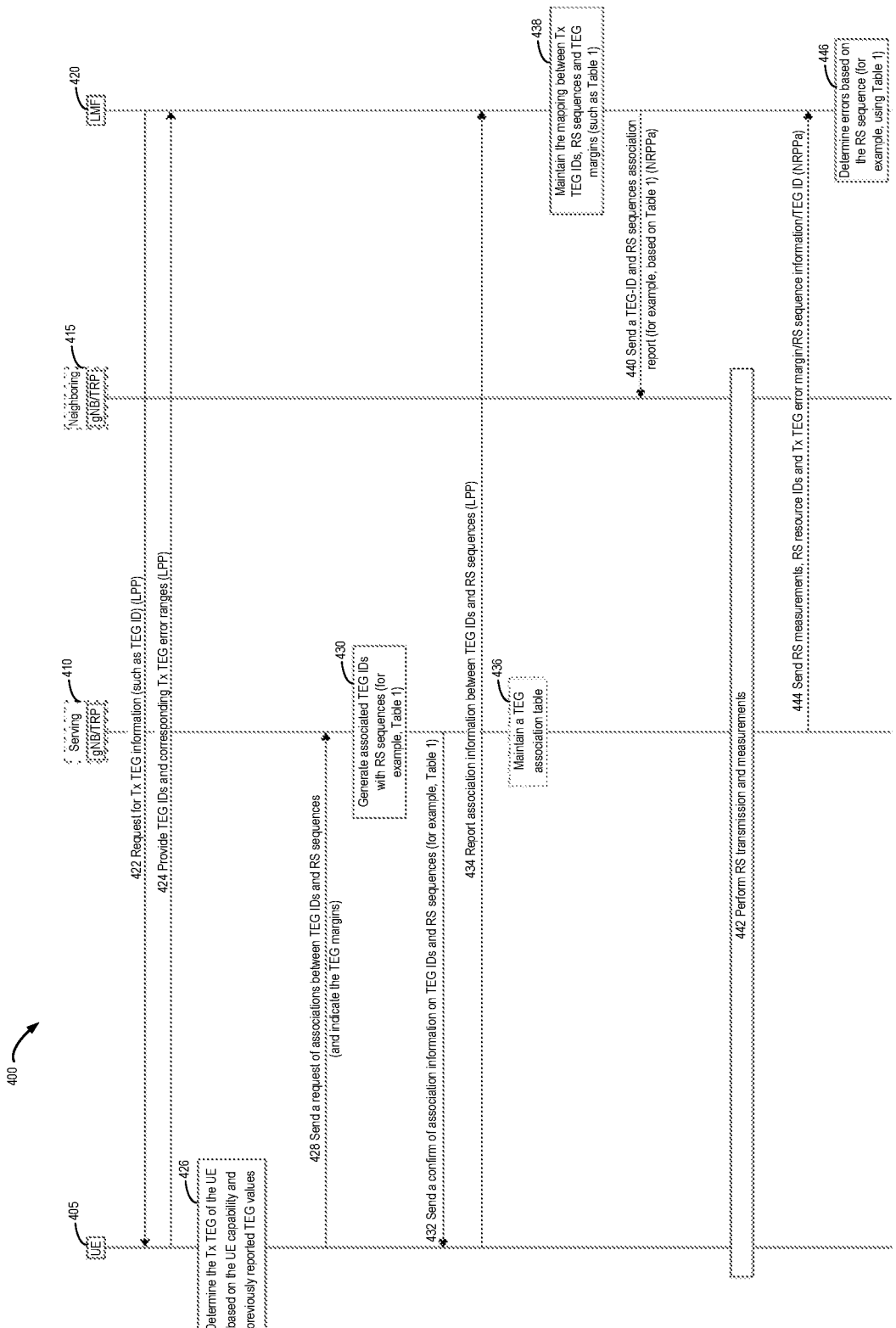
FIG. 4A illustrates a flowchart of an example process for TEG reporting according to some example embodiments of the present disclosure.

Reference is first made to FIG. 4A which shows an example process 400 for TEG reporting according to some example embodiments of the present disclosure.

In this example, a UE 405 acts as an example of the first device 210, a serving gNB/TRP 410 acts as an example of the second device 220, a neighboring gNB/TRP 415 acts as an example of the fourth device 330, and a LMF 420 acts as an example of the third device 320. The TEG error comprises the UE Tx TEG error.

In the process 400, at 422, the LMF 420 may request the UE 405 for the Tx TEG information (such as TEG ID), for example, via LPP. For example, The LMF 420 may request the UE 405 to report its capability including supporting maximum number of TEG IDs over the LPP. At 424, the UE 405 may provide TEG IDs and corresponding Tx TEG error ranges, for example, via LPP. At 426, the UE 405 may determine the Tx TEG of the UE based on the UE capability and previously reported TEG values. At 428, the UE 405 may send a request of associations between TEG IDs and RS sequences (and indicating the TEG margins). At 430, the serving gNB/TRP 410 may generate associated TEG IDs with RS sequences (for example, Table 1). At 432, the serving gNB/TRP 410 may send a confirm of association information on TEG IDs and RS sequences (for example, Table 1). At 434, the UE 405 may report association information between TEG IDs and RS sequences to the LMF 420, for example, via LPP.

Optionally, at 436, the serving gNB/TRP 410 may maintain a TEG association table (such as Table 1). At 438, the LMF 420 may maintain the mapping between Tx TEG IDs, RS sequences and TEG margins (such as Table 1). At 440, the LMF 420 may send a TEG-ID and RS sequences association report (for example, based on Table 1), for example, via NRPPa. At 442, the UE 405, the serving gNB/TRP 410 and the neighboring gNB/TRP 415 may perform RS transmission and measurements. At 444, the serving gNB/TRP 410 may send RS Measurements, RS resource IDs and Tx TEG error margin and/or RS sequence information and/or TEG ID to the LMF 420, for example, via NRPPa. At 446, the LMF 420 may determine errors based on the RS sequence (for example, using Table 1).

Figure 4B:
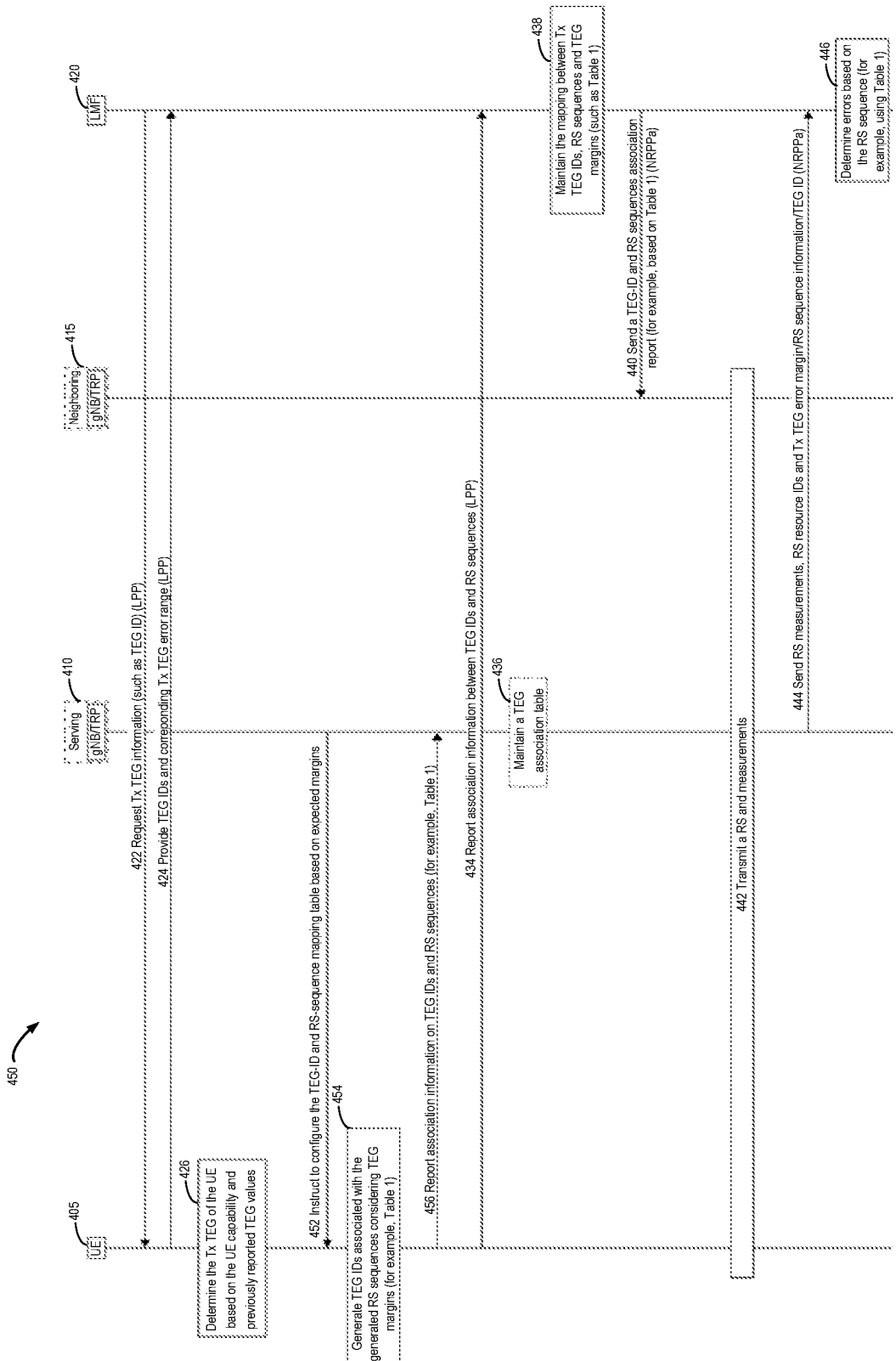
FIG. 4B illustrates a flowchart of an example process for TEG reporting according to some other example embodiments of the present disclosure.

FIG. 4B shows an example process 450 for TEG reporting according to some other example embodiments of the present disclosure.

The process 450 is similar to the process 400 as shown in FIG. 4A and differs from the process 400 in that the associations of the available RS sequences and the TEG IDs are generated by the UE 405 instead of the serving gNB/TRP 410.

As shown in FIG. 4B, at 452, the serving gNB/TRP 410 may instruct to configure the TEG-ID and RS-sequence mapping table based on expected margins. At 454, the UE 405 may generate TEG IDs associated with the generated RS sequences considering TEG margins (for example, Table 1). At 456, the UE 405 may report the association information on TEG IDs and RS sequences (for example, Table 1) to the serving gNB/TRP 410. Other actions or operations in the process 450 are similar to the corresponding ones in the process 400. For the purpose of simplification, the details will be omitted.

In addition to the TEG error reporting, the mechanism of implicitly conveying the position-related side information may be applied to RS configuration changing. Some example embodiments in this regard will be discussed below.

Example Use Case Two: RS Configuration Changing

Configuration information related to the RS may also be needed for the positioning. For example, in order to reduce the number of RS transmissions, especially, when a UE is in an inactive or idle state, to achieve more energy saving, transmission periodicity of the RS may be changed. A bandwidth and/or a transmit power for the RS may also be changed for lower power consumption. These changes are related to the configuration of the reference signal and may be reported to a gNB and/or a LMF.

As mentioned above, RedCap device and LPHAP are important use cases for positioning enhancement. LPHAP is one objective to support requirements of one meter positioning accuracy and 6-12 months battery life. In order to provide long battery life, positioning enhancements may be provided for UE in a RRC inactive and/or RRC idle mode. Moreover, Redcap UE is targeted for some specific use-cases, such as industrial wireless sensors, video surveillance, and wearables to reduce the device cost and complexity in comparison to the legacy NR UE. Such reduction is particularly needed for the industrial wireless sensor use-cases. Furthermore, device size reduction is also required to enable a device design with compact form factor, which is particularly required for the wearable use-cases.

A specific SRS resource may be associated with a specific periodicity. The UE may not be possible to change the periodicity when it transmits the RS resource, and it may be quite difficult to flexibly select a specific transmission antenna panel when transmitting the SRS resource according to the rotation or movement of UE. There may not be an efficient approach for SRS transmission especially for positioning purpose.

In order to achieve more energy saving, it is beneficial to reduce the number of RS transmissions, especially, when the UE is in an inactive or idle state. Within a Discontinuous Reception (DRX) period for the UE in an RRC-inactive state, UL reference signal (such as SRS) transmission is one of main energy consumer. If the UE is stable without moving much, the RS transmission may be skipped to further improve the energy saving, as a location of the UE may not change.

In some example embodiments, a part of RS transmissions may be skipped to reduce the number of RS transmissions for energy saving improvement. In these example embodiments, the positioning-related side information may comprise skipping of a number of subsequent transmission occasions for a RS. In this case, as shown in FIG. 2, when the first device 210 transmits (225) to a second device 230 the RS generated based on the RS sequence selected from the available RS sequences, the skipping of a number of subsequent transmission occasions for the RS may be implicitly indicated to the second device 230 with the selection of the RS sequence.

In this way, the second device 230 may know that one or more RS transmissions are skipped by the first device 210 without delivery of invalid measurement reports, for example, to the third device 320 (as shown in FIG. 3) for positioning. As a result, the number of RS transmissions may be reduced while maintaining required positioning accuracy. Moreover, such an implicit indication for the skipping has a very low cost without consumption of additional energy at both the transmitting and receiving sides.

In some example embodiments, the number of subsequent transmission occasions to be skipped may be configured by the second device 230 to the first device 210. For example, the second device 230 may transmit to the first device 210 a skipping factor "N" (where N represents any suitable positive integer) to indicate that N subsequent transmission occasions should be skipped. The skipping factor "N" may be included in a periodic RS configuration for positioning purpose. As such, the number of subsequent transmission occasions to be skipped may be aligned at the first device 210 and the second device 230, and therefore invalid RS measurements may be avoided to reduce the operation complexity and power consumption.

In some example embodiments, a plurality of skipping factors may be configured. For example, each skipping factor may be associated with one of the available RS sequences. Before each RS transmission, the first device 210 may determine whether or how to skip subsequent RS transmission occasions. Based on the determination, the first device 210 may select the RS sequence from the available RS sequences. If one or more RS transmission occasions are skipped, it may be considered that the RS transmission periodicity becomes larger. Thus, such skipping may be regarded as to a periodicity adaptation for subsequent RS transmissions.

The first device 210 may decide whether to change RS periodicity and select the corresponding RS sequence based on any suitable criteria. In some example embodiments, the RS sequence may be selected from the plurality of available reference signal sequences based on a mobility state of the first device 210. For example, if the first device 210 is moving fast, a smaller (or shorter) periodicity may be used by the first device 210 for RS transmission for more accurate positioning. If the first device 210 is relative stable, a larger (or longer) periodicity may be used for RS transmission for further energy saving improvement. Thus, based on the mobility information, the first device 210 may select the appropriate RS sequence to implicitly indicate the skipping conditions.

Accordingly, the second device 230 may determine the mobility state of the first device 210 based on the side information. In some example embodiments, the second device 230 may transmit an indication of the mobility state of the first device 210 to the third device 320, for example, over NRPPa. The third device 230 then may position the first device 210 by considering its mobility state.

The mobility information may be obtained by sensors such as IMU (inertial measurement unit). Alternatively, or in addition, the first device 210 may roughly know it moves or not by monitoring synchronization signaling blocks (SSBs), for example, from the second device 230. For example, the first device 210 may calculate the SSB—Reference Signal Receiving Power (RSRP) difference between two subsequent time instances, represented as $SSB\_RSRP_{t1}$ and $SSB\_RSRP_{t2}$, respectively. If the difference is smaller than a threshold, little movement may be determined.

As another example, the first device 210 may obtain its mobility information from other devices. For example, the third device 320 (such as the location device 130 as shown in FIG. 1) for positioning may keep tracking the location of the first device 210 and therefore may predict the movement of the first device 210. If the third device 320 identifies that the first device 210 changes movement status (for example, from moving slow to moving fast), the third device 320 may indicate the change of the movement status to the first device 210. Such an indication may be transmitted to the first device 210 in any suitable way. For example, in the example embodiments where the first device 210 is implemented by the terminal device 110 as shown in FIG. 1, the indication may be transmitted in a modified paging message or other signaling from the network to the first device 210, for example, in an RRC-inactive or idle state.

Instead of or in addition to the mobility state, a battery state may be considered by the first device 210 in the selection of the RS sequence. For example, if the first device 210 is running low on battery, the first device 210 may make a decision on switching to use a larger periodicity to transmit the RS and select the corresponding RS sequence from the available RS sequences.

In some example embodiments, the selection of the RS sequence may be implemented based on whether the first device 210 is in power saving, and therefore may indicate a power-saving state of the first device 210. Thus, after receiving the RS, the second device 230 may determine the power-saving state of the first device 210 based on the side information and may further send an indication of the power-saving state of the first device 210 to the third device 230 for the positioning purpose. Alternatively or in addition, the RS sequency may be selected based on a RRC connection state of the first device 210.

Some example embodiments of skipping RS transmission occasions will be discussed below with reference to FIGS. 5A and 5B.

Figure 5A:
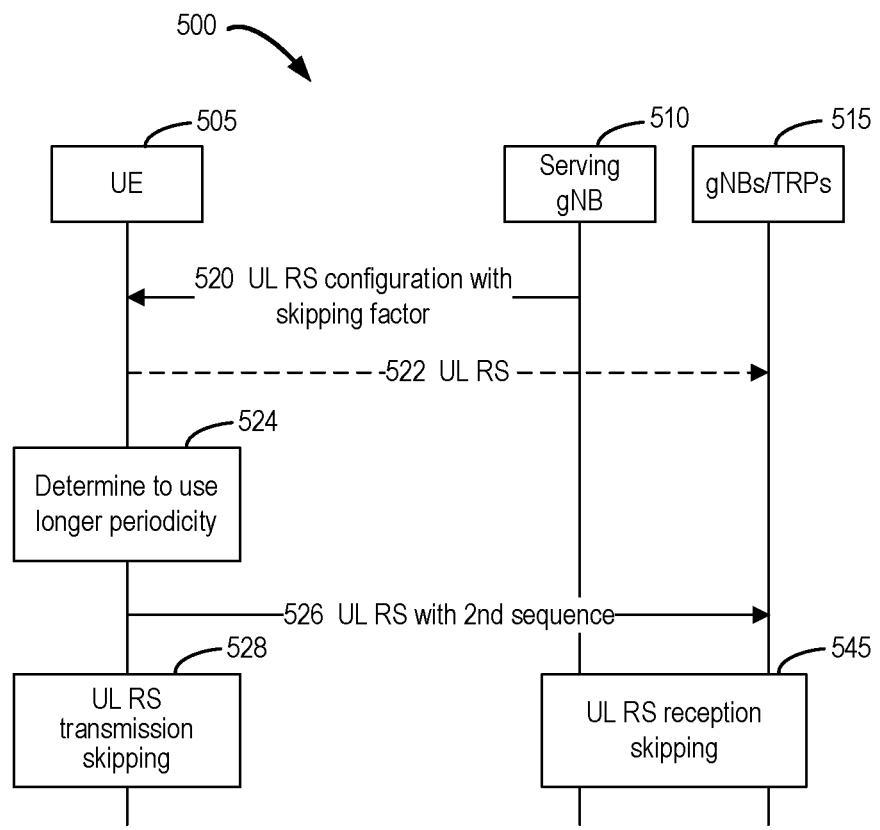
FIG. 5A illustrates a flowchart of an example process of skipping RS transmission occasions according to some example embodiments of the present disclosure.

FIG. 5A shows an example process 500 of skipping RS transmission occasions according to some example embodiments of the present disclosure.

In this example, a UE 505 acts as an example of the first device 210, and a serving gNB 510 acts as an example of the second device 230. In addition, as shown in FIG. 5A, the process 500 involves other gNBs/TRPs 515 for the positioning of the UE 505.

In the process 500, the serving gNB 510 provides (520) a UL RS configuration with a skipping factor "N" to the UE 505 for UL positioning purpose. The UE 505 may transmit (522) the UL RS to the serving gNB 510 as well as other gNBs/TRPs 515 using the configuration. In this example, two RS sequences may be assigned to the UE 510 from the serving gNB 510 where one RS sequence (referred to as a first RS sequence) indicates no skipping and the other RS sequence (referred to as a second RS sequence) indicates skipping of RS transmission occasions.

If the UE 505 determines to use configured UL RS periodicity, the UE 505 may transmit a next UL RS with the first RS sequence (not shown). If the UE 505 determines (524) to use a longer periodicity by skipping the RS transmission occasions, the UE 505 may transmit (526) a next UL RS with the second RS sequence to the serving gNB 510 and other gNBs/TRPs 515, which may implicitly indicate the periodicity change. After transmitting the next UL RS, the UE 505 may perform (528) UL RS transmission skipping by skipping the following N (as indicated by the skipping factor) UL RS occasions.

Figure 5B:
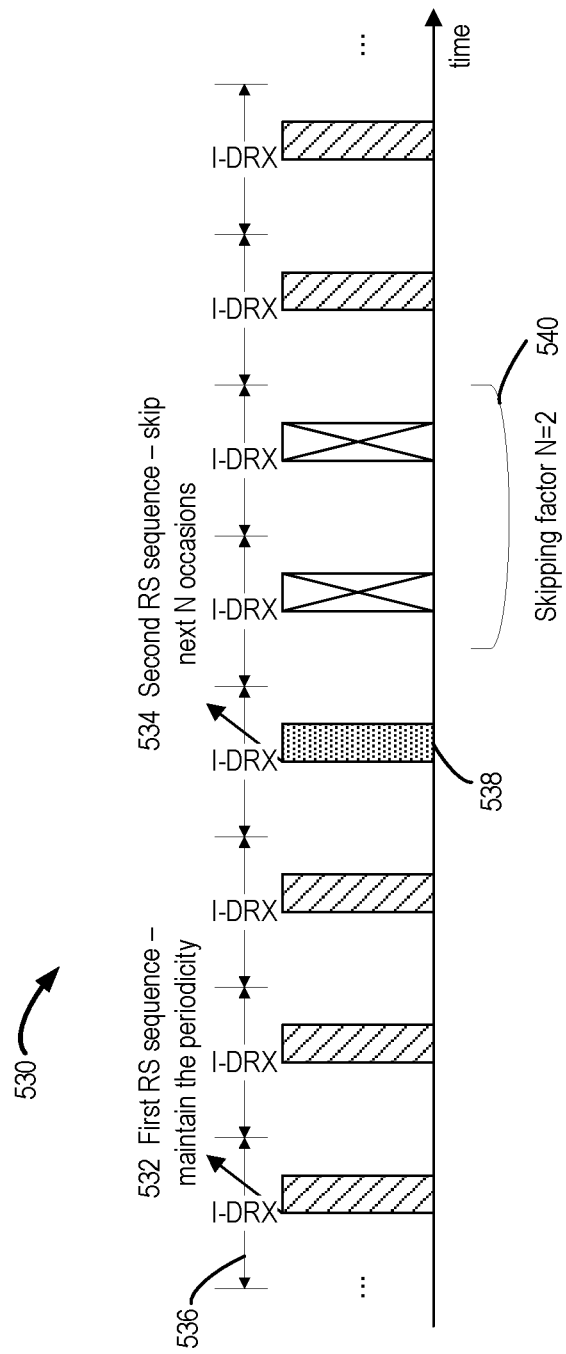
FIG. 5B illustrates an UL RS configuration for the skipping according to some example embodiments of the present disclosure.

FIG. 5B shows an UL RS configuration 530 for the skipping with a skipping factor N=2 according to some example embodiments of the present disclosure.

As shown in FIG. 5B, the first RS sequence 532 indicates maintaining the periodicity, and the second RS sequence 534 indicates skipping the next N (N=2) occasions. Within a DRX period 536 for the UE 505 in RRC-inactive state (labeled as I-DRX), a UL RS is transmitted with either the first RS sequence 532 or the second RS sequence 534. At a RS transmission occasion 538, the UE 505 may decide to use a longer periodicity and then transmit a RS with the second RS sequence 534 to indicate that the next two RS transmissions 540 will be skipped.

Still with reference to FIG. 5A, accordingly, the serving gNB 510 and the gNBs/TRPs 515 may check at each UL RS occasion whether the first or the second PS sequence is transmitted. If the second RS sequence is detected, the serving gNB 510 and other gNBs/TRPs 515 may know that the next N RS occasions will be skipped by the UE 505. Hence, the serving gNB 510 and the gNBs/TRPs 515 may perform (545) UL RS reception skipping with no measurement and associated report for these skipped UL RSs.

It is to be understood that the UL RS transmission is shown in FIGS. 5A and 5B only for the purpose of illustration, without suggesting any limitation. In some example embodiments, the skipping may be performed for DL RS transmissions. In these example embodiments, the serving gNB 510 or the gNBs/TRPs 515 may act as an example of the first device 210, and the UE 505 may act as an example of the second device 230.

Figure 6:
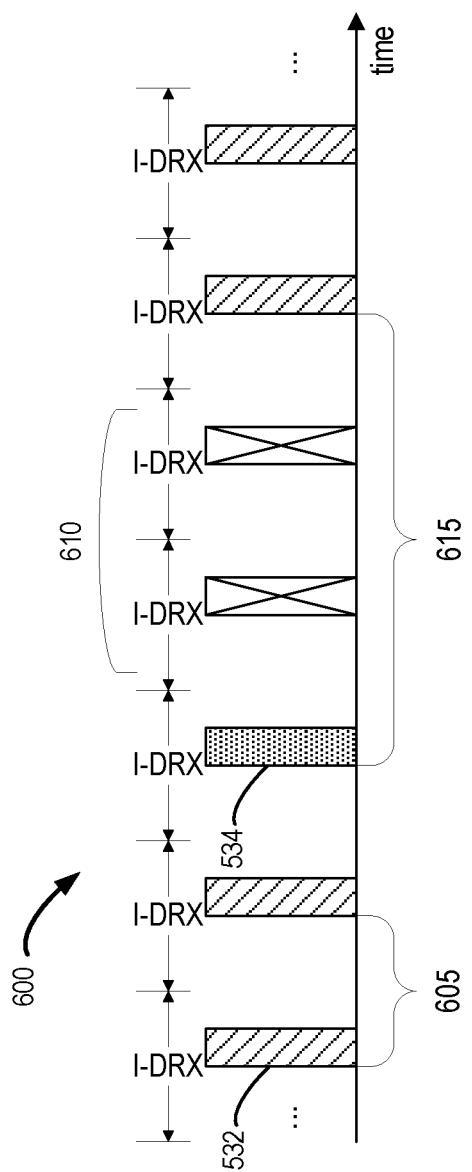
FIG. 6 illustrates an UL RS configuration for the skipping according to some other example embodiments of the present disclosure.

As mentioned above, the skipping of RS transmission occasions may be equivalent to an increase of the RS transmission periodicity. FIG. 6 shows such an equivalence. In the UL RS configuration 600 as show in FIG. 6, the first RS sequence 532 may be transmitted in a periodicity 605. After the first RS sequence 532 has been transmitted twice, at a RS transmission occasion 610, the second RS sequence 534 may be selected. Then, the next two RS transmission occasions 610 for the RS may be skipped, which may be equivalent to a longer periodicity 615 is used instead of the first periodicity 605.

Instead of or in addition to the periodicity adaptation, a bandwidth and/or a transmit power for the RS may also be changed for further reducing power consumption. In some example embodiments, the first device 210 may be provided with a plurality of RS configurations which may comprise at least one of different periodicities, different bandwidths, different transmit powers, or different time and/or frequency resources such as resource blocks or resource elements or time slots. These RS configurations are associated with the plurality of available reference signal sequences. In these example embodiments, the side information conveyed with the selection of the RS sequence from the available reference signal sequences may comprise a configuration of a plurality of configurations to be used to transmit a subsequent RS.

In this way, on-demand adjustment of RS configurations may be provided to the first device 210 while this adjustment may be reported to the second device 230 in signaling and network resource efficient ways. Accordingly, power consumption and signaling overhead may be further reduced, thereby further improving the system efficiency.

In some example embodiments, the plurality of configurations may be indicated from the network from the network. For example, an indication of the plurality of configurations may be received from the second device 230 (such as the base station 120 or 122) in a modified paging message or other signaling. Alternatively, or in addition, the indication may be received from the third device 320 (such as the location device 130) via LPP protocol.

Before each RS transmission, the first device 210 may determine whether to adapt the RS configuration based on certain criteria such as a mobility state, a power-saving state, a RRC connection state and/or a battery state. The determining procedure or rules of RS configuration adaptation are similar to those of RS periodicity adaptation. For the purpose of simplification, the details will be omitted.

In some example embodiments, after the first device 210 selects (215) the RS sequence and generates (220) the RS based on the selected RS sequence as shown in FIG. 2, the first device 210 may transmit the generated RS in a configuration (referred to as a first configuration) of the plurality of configurations while the selection of the RS sequence may indicate another configuration (referred to as a second configuration) of the plurality of configurations to be used for the subsequent RS. The first and second configurations may comprise different periodicities, referred to as a first periodicity and a second periodicity, respectively.

In some example embodiments, the second periodicity may be shorter than the first periodicity. After the generated RS is transmitted using the first configuration with the first periodicity, the first device 210 may transmit a subsequent RS using the second configuration with the second periodicity before a next transmission occasion associated with the first configuration. As such, there may be one or more RS transmissions with the second periodicity in between two RS transmissions with the first periodicity. The number of RS transmissions with the second periodicity may depend on a comparison between the lengths of the first and second periodicities.

Some example embodiments of RS configuration adjustment will be discussed below with reference to FIGS. 7A and 7B.

Figure 7A:
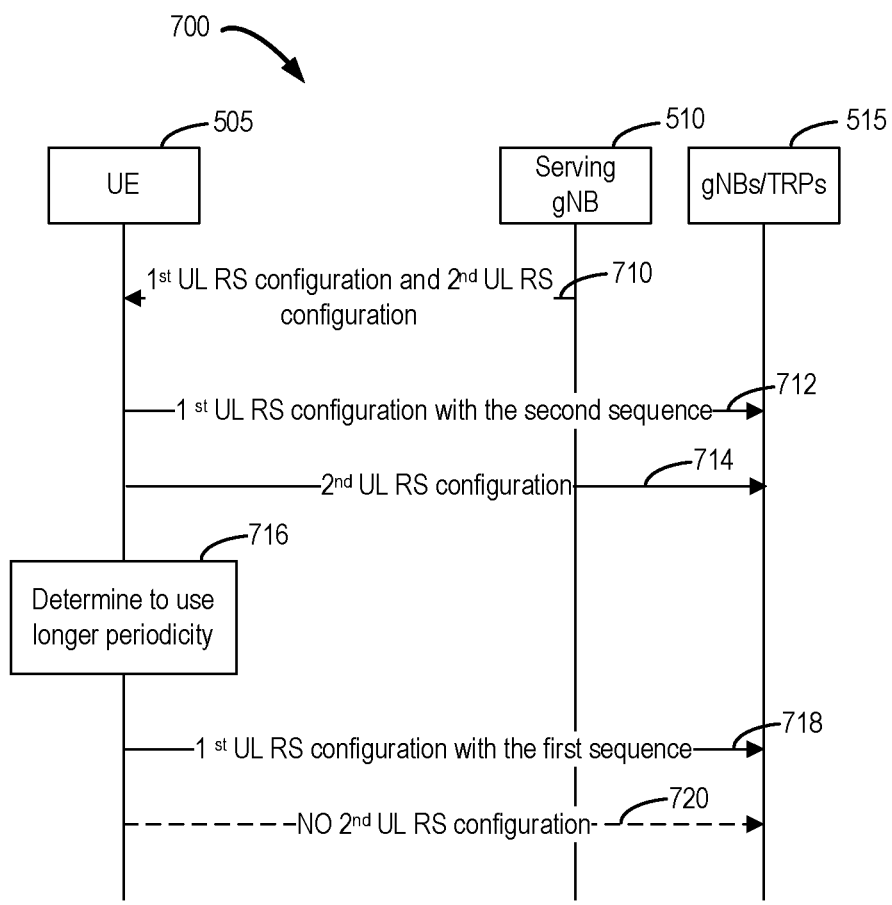
FIG. 7A illustrates a flowchart of an example process of changing a RS configuration according to some example embodiments of the present disclosure.

FIG. 7A shows an example process 700 of changing a RS configuration according to some example embodiments of the present disclosure.

Similar to the process 500 as shown in FIG. 5A, in the process 700, the UE 505 acts as an example of the first device 210, the serving gNB 510 acts as an example of the second device 230, and the gNBs/TRPs 515 are also involved. Only for the purpose of illustration, the process 700 involves UL RS transmission as an example of RS transmission. Accordingly, the configuration comprises UL RS configuration. In some example embodiments, the configuration changing may be performed for DL RS transmissions.

As shown in FIG. 7A, the serving gNB 510 may provide (710) two UL RS configurations to the UE 505 for UL positioning purpose, including a first UL RS configuration and a second UL RS configuration (as examples of the first and second configures above). The first UL RS configuration may comprise the first periodicity, and the second UL RS configuration may comprise the second periodicity.

In this example, the first periodicity may be longer than the second periodicity. There may be one or more UL RS transmissions using the UL RS second configuration in between two UL RS transmissions using the first UL RS configuration, for example, within a periodicity of the first UL RS configuration. In addition, the first UL RS configuration may be configured with less bandwidth and/or less transmit power than the second UL RS configuration to further improve energy saving.

Two UL PRS sequences, including the first sequence and the second sequence, may be assigned to indicate the two UL RS configurations, respectively. Before each UL RS transmission, the UE 505 may determine whether to adjust a UL RS configuration or not. If the UE 505 decides to change the UL RS transmission periodicity, the UE 505 may transmit (712) the UL RS with the second sequence using the first UL RS configuration. Then, the UE 505 may transmit (714) UL RSs using the second UL RS configuration before the next UL RS occasion based on the first UL RS configuration.

If the UE 505 determines (716) to use a longer periodicity, which means that the UE 505 decides to maintain the first periodicity for UL RS transmission, the UE 505 may transmit (718) the UL RS with the first sequence using the first UL RS configuration while the second UL RS configuration may not be triggered (720).

At each UL RS occasion based on the first UL RS configuration, the serving gNB 510 and the gNBs/TRPs 515 may detect which sequence is transmitted by the UE 505. If it is the first sequence, the serving gNB 510 and the gNBs/TRPs 515 may know that there is no UL RSs using the second UL RS configuration before the next UL RS occasion associated with the first UL RS configuration. If it is the second sequence, the serving gNB 510 and the gNBs/TRPs 515 may perform measurements on the UL RSs based on the second UL RS configuration before the next UL RS occasion for the first UL RS configuration and may conduct the associated measurement reports accordingly.

Such configuration changes may also be reported to a location device (such as the location device 130 as shown in FIG. 1) for positioning of the UE 505. Accordingly, the location device may detect the measurement reports from the gNBs/TRPs based on the configuration changes, thereby further improving the positioning accuracy and efficiency.

Figure 7B:
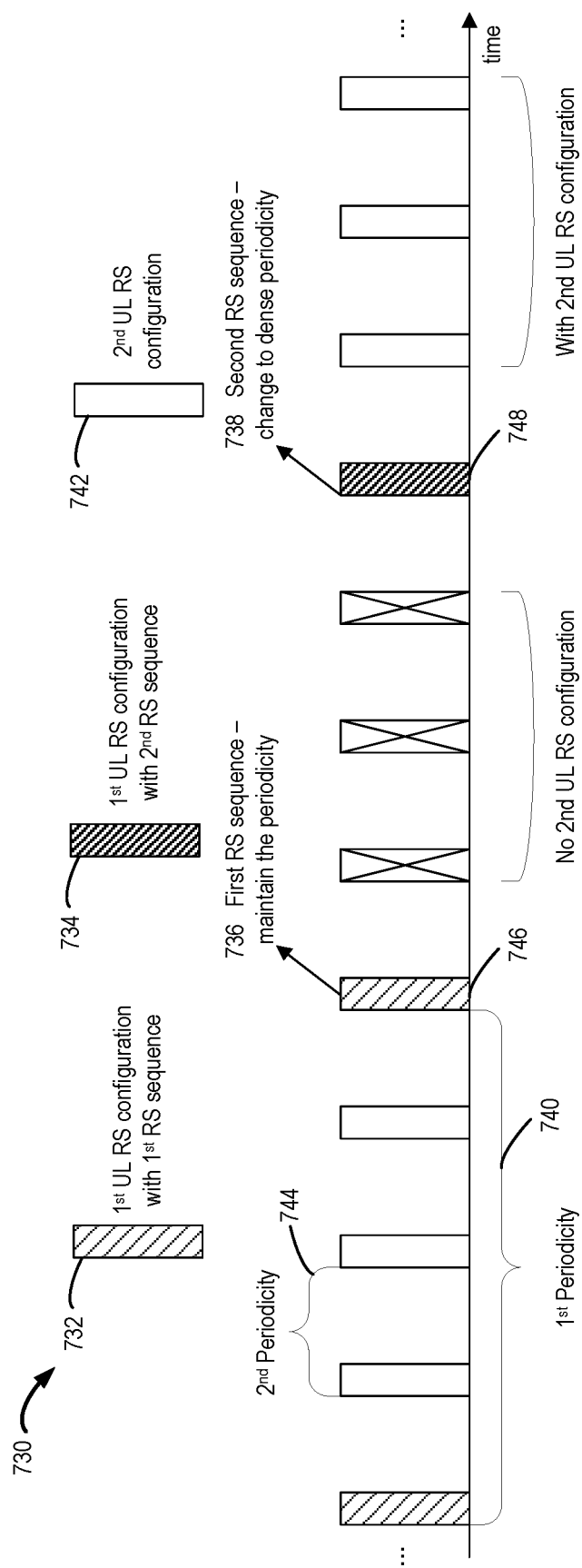
FIG. 7B illustrates an UL RS configuration for RS configuration changing according to some example embodiments of the present disclosure.

FIG. 7B shows an UL RS configuration 730 for RS configuration changing according to some example embodiments of the present disclosure.

As shown in FIG. 7B, the first UL RS configurations 732 and 734 with the first and second RS sequences 736 and 738 may comprise the first periodicity 740, and the second UL RS configuration 742 may comprise the second periodicity 744. The first RS sequence 736 may indicate maintaining the periodicity, and the second RS sequence 738 may indicate changing to a smaller (or larger) periodicity.

At a RS transmission occasion 746, the UE 505 may transmit a UL RS using the first UL RS configuration 732 with the first RS sequence 736, which may indicate that the periodicity may not be changed. Then, the UE 505 may transmit a UL RS in a next transmission occasion 748 based on the first UL RS configuration. There is no RS transmission using the second UL RS configuration between the two transmission occasions 746 and 748. At the transmission occasion 748, the UL RS may be transmitted with the second RS sequence 738, which may indicate changing to a dense periodicity. Then, before a next transmission occasion (not shown), UL RSs may be transmitted using the second UL RS configuration 742.

Figure 8:
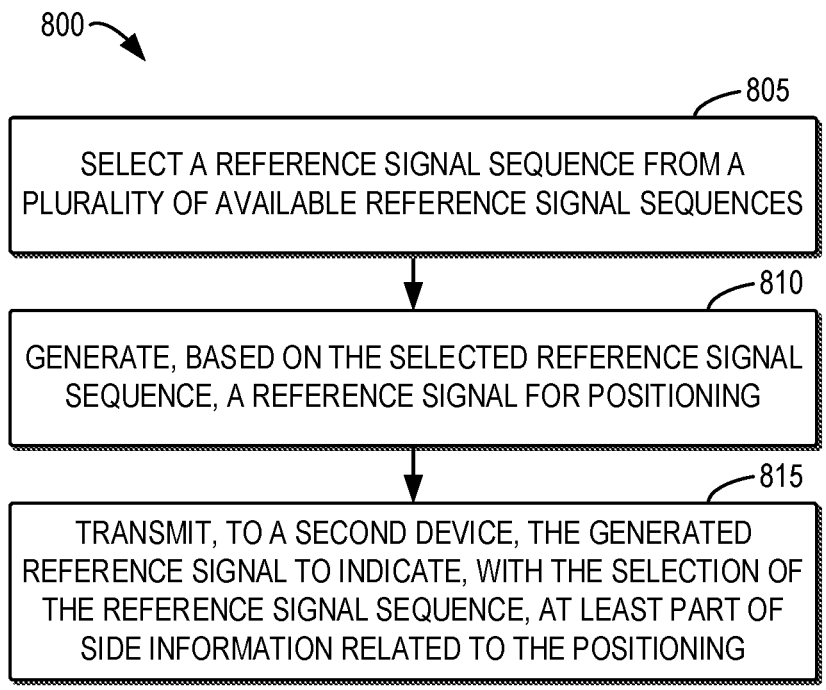
FIG. 8 illustrates a flowchart of an example method for indicating the positioning related information in accordance with some example embodiments of the present disclosure.

FIG. 8 shows a flowchart of an example method 800 for indicating the positioning related information in accordance with some example embodiments of the present disclosure. The method 800 may be implemented at the first device 210 as shown in FIGS. 2 and 3. For the purpose of discussion, the method 800 will be described from the perspective of the first device 210 with reference to FIGS. 2 and 3.

At block 805, the first device 210 selects a RS sequence from a plurality of available RS sequences. The available RS sequences may be configured by the network. For example, the first device 210 may receive an indication of the available RS sequences from the second device 230. The indication may comprise RS sequence IDs. These available RS sequences may be configured in or for a RS resource.

At block 810, the first device 210 generates, based on the selected RS sequence, a RS for positioning, such as a UL SRS or a DL PRS. At block 815, the first device 210 transmits, to the second device 230, the generated RS to indicate, with the selection of the RS sequence, at least part of the side information related to the positioning.

In some example embodiments, the side information may be determined at least in part by the first device. The side information may comprise additional information associated with determined hardware or software processing latencies and/or delays of the first device. Alternatively or in addition, the side information may comprise additional information associated with energy or capability constraints of the first device.

In some example embodiments, the side information may comprise at least one of an identification or a margin of a TEG associated with the selected RS sequence. For example, the association may be generated between the RS sequence and at least one of an ID or a margin of the TEG.

In some example embodiments, prior to selecting the RS, the first device 210 may cause the association of the RS sequence and the at least one of the ID or the margin of the TEG. To cause the association, the first device 210 may request the second device 230 for the association. In some example embodiments, the first device 210 may request the second device 230 for associations of the plurality of available RS sequences and a plurality of available IDs of TEGs that comprises the ID of the TEG.

As an example of the request, the first device 210 may send to the second device 230 an indication of the plurality of available IDs of TEGs to request for RS sequences associated with the respective ones of the available IDs of TEGs. As a response, the first device 210 may receive, from the second device 230, an indication of the associations of the plurality of available RS sequences with the plurality of available IDs of TEGs.

In some example embodiments, as a response to the request for the associations, the first device 210 may receive, from the second device 230, a plurality of root indexes to generate RS sequences for the plurality of available IDs of TEGs. Using the plurality of root indexes, the first device 210 may generate the plurality of available RS sequences to be associated with the plurality of available IDs of TEGs.

In some example embodiments, to cause the association of the RS sequence and the at least one of the ID or the margin of the TEG, the first device 210 may generate the associations of the plurality of available RS sequences and the plurality of available IDs of TEGs. The generating may be performed in response to receiving from the second device 230 an instruction to generate the associations. In some example embodiments, the first device 210 transmit an indication of the generated associations to the second device 230.

In some example embodiments, the first device 210 may report the associations of the plurality of available RS sequences and the plurality of available IDs of TEGs to the third device 320 for the positioning. The associations may be generated by the first device 210, or by the second device 230 and indicated to the first device 210.

In some example embodiments, the associations may be generated between the plurality of available IDs of TEGs with a plurality of margins of TEGs. This association may be generated based on granularity of a TEG error that may be determined based on the number of available RS sequences and a margin offset for the plurality of available IDs of TEGs. For example, the first device 210 may determine the number of the available RS sequences and a margin offset for a plurality of available IDs of TEGs. Based on the number of the available RS sequences and the margin offset, the first device 210 may associate the plurality of available IDs of TEGs with the plurality of margins of TEGs.

In some example embodiments, the side information may comprise a configuration of a plurality of configurations to be used to transmit a subsequent RS. The plurality of configurations may comprise at least one of different periodicities, bandwidths, transmit powers, or time and/or frequency resources. In this case, the section of the RS from the available RS sequences may indicate the configuration to be used for the subsequent RS transmission.

In some example embodiments, the first device 210 may receive an indication of the plurality of configurations from the second device 220. This indication may be received by the first device 210 in a (modified) paging message or other signaling, for example, in an RRC-inactive or idle state. In some other example embodiments, the first device 210 may receive the indication from the third device 320 via LPP.

In some example embodiments, the first device 210 may transmit the generated RS in a first configuration of the plurality of configurations to indicate, with the selection of the RS, a second configuration of the plurality of configurations to be used for the subsequent RS. The first configuration may comprise a first periodicity, and the second configuration may comprise a different second periodicity.

In some example embodiments, the second periodicity may be shorter than the first periodicity. In these example embodiments, the first device 210 may transmit the subsequent RS in the second periodicity before a next transmission occasion associated with the first configuration.

In some example embodiments, the side information may comprise skipping of a number of subsequent transmission occasions for a RS. Thus, by selecting an appropriate RS sequence, it may be implicitly indicated to skip a number of subsequent transmission occasions. In some example embodiments, the first device 210 may receive an indication of the number from the second device 230.

In some example embodiments, the RS sequence may be selected from the plurality of available RS sequences based on at least one of a mobility state, a power-saving state, a RRC connection state or a battery state of the first device 210. In some example embodiments, the method 800 may be implemented by the first device 210 in an inactive or idle mode.

Figure 9:
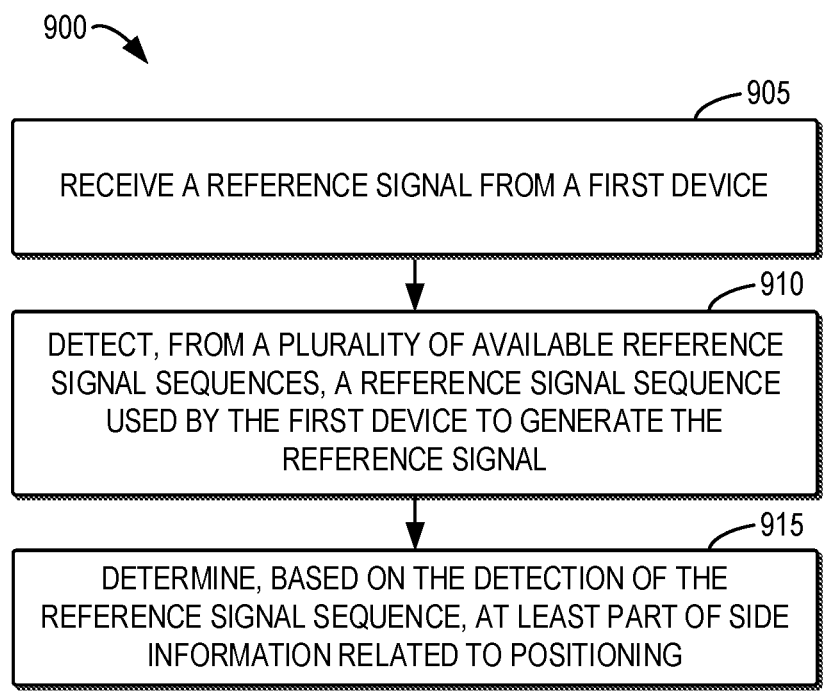
FIG. 9 illustrates a flowchart of an example method for indicating the positioning related information in accordance with some other example embodiments of the present disclosure.

FIG. 9 shows a flowchart of an example method 900 for indicating the positioning related information in accordance with some other example embodiments of the present disclosure. The method 900 may be implemented at the second device 230 as shown in FIGS. 2 and 3. For the purpose of discussion, the method 900 will be described from the perspective of the second device 230 with reference to FIGS. 2 and 3.

At block 905, the second device 230 receives a RS (such as a UL SRS or a DL PRS) from the first device 210. At block 910, the second device 230 detects, from a plurality of available RS sequences, a RS sequence used by the first device 210 to generate the RS. In some example embodiments, the second device 230 may configure and indicate the plurality of available RS sequences to the first device 210. The available RS sequences may be configured for a RS resource. At block 915, based on the detection of the detected RS sequence from the available RS sequences, the second device 230 determines at least part of the side information related to positioning.

In some example embodiments, the side information may comprise at least one of an ID or a margin of a TEG associated with the detected RS sequence. In some example embodiments, the second device 230 may cause the association of the RS sequence and the at least one of the ID or the margin of the TEG.

To cause the association, in some example embodiments, the second device 230 may receive, from the first device 210, a request for associations of the plurality of available RS sequences and a plurality of available IDs of TEGs that comprises the ID of the TEG. In response to receiving the request, the second device 230 may cause the associations of the plurality of available RS sequences and the plurality of available IDs of TEGs.

As an example of the request, the second device 230 may receive, from the first device, an indication of the plurality of available IDs of timing error groups to request for RS sequences associated with the respective ones of the plurality of available IDs of timing error groups. In response to receiving the indication of the plurality of available IDs of timing error groups, the second device 230 may generate the associations of the plurality of available RS sequences and the plurality of available IDs of TEGs. Then, the second device 230 may transmit, to the first device 210, an indication of the generated associations.

In some example embodiments, in response to receiving the indication of the plurality of available IDs of TEGs, the second device 230 may transmit, to the first device 210, a plurality of root indexes to generate RS sequences for the plurality of available IDs of TEGs.

To cause the association, in some example embodiments, the second device 230 may transmit, to the first device 210, an instruction to generate the associations. The second device 230 may receive, from the first device 210, a report of the associations of the plurality of available RS sequences and the of available IDs of TEGs.

In some example embodiments, the side information may comprise a configuration of a plurality of configurations to be used to receive a subsequent RS, and the plurality of configurations may comprise at least one of different periodicities, bandwidths, transmit powers, or time and/or frequency resources.

In some example embodiments, the second device 220 may send an indication of the plurality of configurations to the first device 210 to the first device 210 in any suitable signaling. For example, when the first device 210 is in an RRC-inactive or idle state, the second device 220 may transmit the indication to the first device 210 in a paging message.

In some example embodiments, the reference signal may be received by the second device 230 in a first configuration of the plurality of configurations to indicate a second configuration of the plurality of configurations to be used for the subsequent reference signal. Accordingly, the second device 230 may receive the subsequent reference signal using the second configuration. The first configuration may comprise a first periodicity, and the second configuration may comprise a different second periodicity.

In some example embodiments, the second periodicity may be shorter than the first periodicity. In these example embodiments, the second device 230 may receive, from the first device 210, the subsequent reference signal in the second periodicity before a next transmission occasion associated with the first configuration.

In some example embodiments, the side information may comprise skipping of a number of subsequent transmission occasions for a RS. The number of subsequent transmission occasions may be indicated by the second device 230 to the first device 210. For example, the second device 230 may transmit an indication of the number to the first device 210.

In some example embodiments, the RS sequence may be selected based on at least one of a mobility state, a power-saving state, a RRC connection state or a battery state of the first device 210. In these example embodiments, the second device 220 may determine, based on the side information, the at least one of the mobility state, the power-saving state, the RRC connection state or the battery state of the first device 210. Then, the second device 220 may transmit an indication of the at least one of the mobility state, the power-saving state, the RRC connection state or the battery state of the first device 210 to the third device 320 for the positioning purpose, for example, over NRPPa.

Figure 10:
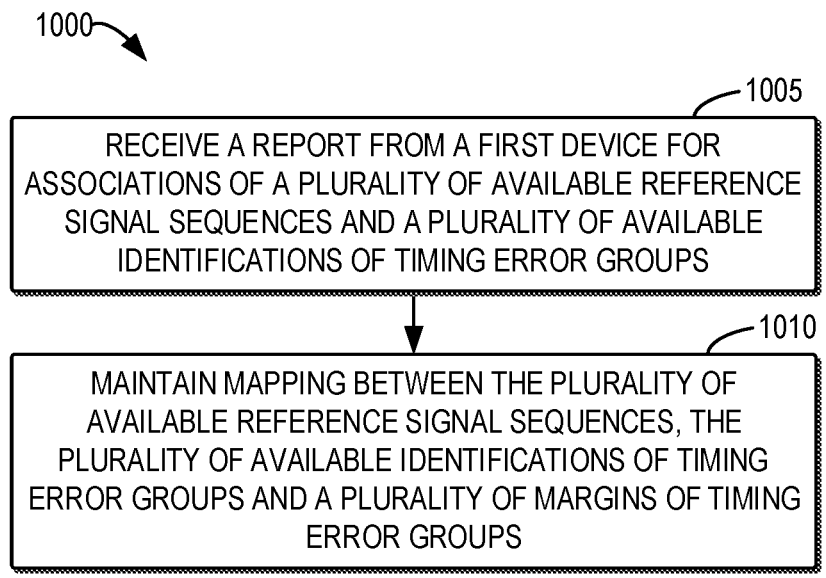
FIG. 10 illustrates a flowchart of an example method for indicating the positioning related information in accordance with yet other example embodiments of the present disclosure.

FIG. 10 shows a flowchart of an example method 1000 for indicating the positioning related information in accordance with yet other example embodiments of the present disclosure. The method 1000 may be implemented at the third device 320 as shown in FIG. 3. For the purpose of discussion, the method 1000 will be described from the perspective of the third device 320 with reference to FIG. 3.

At block 1005, the third device 320 receives a report from the first device 210 for associations of a plurality of available RS sequences and a plurality of available IDs of TEG. At block 1010, the third device 320 maintains mapping between the plurality of available RS sequences, the plurality of available IDs of TEGs and a plurality of margins of TEGs.

In some example embodiments, the third device 320 may receive, from the second device 230, a first measurement of a RS and at least one of a RS sequence of the plurality of available RS sequences or an ID of the plurality of available IDs of TEGs. The reference signal sequence may be used to generate the RS. The third device 320 may then determine a margin of the plurality of margins of TEGs associated with the at least one of the RS sequence or the ID. Based on at least the first measurement of the RS and the margin of the plurality of margins of TEGs, the third device 320 may determine a position of the first device 210.

In some example embodiments, the third device 320 may send, to the fourth device 330, an indication of the associations of the plurality of available RS sequences and the plurality of available IDs of TEGs. The third device 320 may receive, from the fourth device 330, a second measurement of the RS and at least one of the RS sequence or the ID. The position of the first device may be determined further based on the second measurement.

In some example embodiments, the third device 320 may receive, from the second device 220, an indication of at least one of a mobility state, a power-saving state, a RRC connection state or a battery state of the first device 210. Accordingly, the third device 320 may know whether the first device 210 is moving or not, and/or whether the first device 210 is in power saving or not. The third device 320 may determine the position of the first device 210 further based on such information as the mobility state, the power-saving state, the RRC connection state and/or the battery state of the first device 210.

All operations and features as described above with reference to FIGS. 1 to 7B are likewise applicable to the methods 800 to 1000 and have similar effects. For the purpose of simplification, the details will be omitted.

In some example embodiments, an apparatus capable of performing the method 800 (for example, the first device 210 as shown in FIGS. 2 and 3) may comprise means for performing the respective steps of the method 800. The means may be implemented in any suitable form. For example, the means may be implemented in a circuitry or software module.

In some example embodiments, the apparatus comprises means for selecting a reference signal sequence from a plurality of available reference signal sequences; means for generating, based on the selected reference signal sequence, a reference signal for positioning; and means for transmitting, to a second device, the generated reference signal to indicate, with the selection of the reference signal sequence, at least part of side information related to the positioning.

In some example embodiments, the side information may comprise at least one of an identification or a margin of a timing error group associated with the selected reference signal sequence.

In some example embodiments, the apparatus may further comprise means for prior to the selecting, causing the association of the reference signal sequence and the at least one of the identification or the margin of the timing error group.

In some example embodiments, the means for causing the association may comprise: the means for requesting the second device for associations of the plurality of available reference signal sequences and a plurality of available identifications of timing error groups, the plurality of available identifications of timing error groups comprising the identification of the timing error group.

In some example embodiments, the means for requesting the second device for the associations comprises: means for sending, to the second device, an indication of the plurality of available identifications of timing error groups to request for reference signal sequences associated with respective ones of the plurality of available identifications of timing error groups.

In some example embodiments, the apparatus may further comprise means for in response to the sending, receiving, from the second device, an indication of the associations of the plurality of available reference signal sequences with the plurality of available identifications of timing error groups.

In some example embodiments, the apparatus may further comprise means for in response to the sending, receiving, from the second device, a plurality of root indexes to generate reference signal sequences for the plurality of available identifications of timing error groups; and means for generating, using the plurality of root indexes, the plurality of available reference signal sequences to be associated with the plurality of available identifications of timing error groups.

In some example embodiments, the means for causing the association may comprise: means for generating associations of the plurality of available reference signal sequences and a plurality of available identifications of timing error groups, the plurality of available identifications of timing error groups comprising the identification of the timing error group.

In some example embodiments, the apparatus may further comprise means for receiving, from the second device, an instruction to generate the associations.

In some example embodiments, the apparatus may further comprise means for reporting the associations of the plurality of available reference signal sequences and the plurality of available identifications of timing error groups to a third device for the positioning.

In some example embodiments, the apparatus may further comprise means for determining the number of the available reference signal sequences and a margin offset for a plurality of available identifications of timing error groups, the plurality of available identifications of timing error groups comprising the identification of the timing error group; and means for associating, based on the number of the available reference signal sequences and the margin offset, the plurality of available identifications of timing error groups with a plurality of margins of timing error groups, the plurality of margins of timing error groups comprising the margin of the timing error group.

In some example embodiments, the side information may comprise a configuration of a plurality of configurations to be used to transmit a subsequent reference signal, and the plurality of configurations may comprise at least one of different periodicities, bandwidths, transmit powers, or time and/or frequency resources.

In some example embodiments, the apparatus may further comprise means for receiving, from the second device, an indication of the plurality of configurations.

In some example embodiments, the generated reference signal may be transmitted in a first configuration of the plurality of configurations to indicate a second configuration of the plurality of configurations to be used for the subsequent reference signal, the first configuration may comprise a first periodicity, and the second configuration may comprise a different second periodicity.

In some example embodiments, the second periodicity may be shorter than the first periodicity. The apparatus may further comprise: means for transmitting the subsequent reference signal in the second periodicity before a next transmission occasion associated with the first configuration.

In some example embodiments, the side information may comprise skipping of a number of subsequent transmission occasions for a reference signal.

In some example embodiments, the apparatus may further comprise means for receiving an indication of the number from the second device.

In some example embodiments, the reference signal sequence may be selected from the plurality of available reference signal sequences based on at least one of a mobility state, a power-saving state, a RRC connection state or a battery state of the first device.

In some example embodiments, the apparatus may further comprise means for receiving, from the second device, an indication of the plurality of available reference signal sequences.

In some example embodiments, the plurality of available reference signal sequences may be configured for a reference signal resource.

In some example embodiments, the first device may be in an inactive or idle mode.

In some example embodiments, the reference signal sequence may comprise a sounding reference signal sequence.

In some example embodiments, the side information may be determined at least in part by the first device, and the side information may comprise additional information associated with at least one of: determined hardware or software processing latencies and/or delays of the first device, or energy or capability constraints of the first device.

In some example embodiments, an apparatus capable of performing the method 900 (for example, the second device 230 as shown in FIGS. 2 and 3) may comprise means for performing the respective steps of the method 900. The means may be implemented in any suitable form. For example, the means may be implemented in a circuitry or software module.

In some example embodiments, the apparatus comprises: means for receiving a reference signal from a first device; means for detecting, from a plurality of available reference signal sequences, a reference signal sequence used by the first device to generate the reference signal; and means for determining, based on the detection of the reference signal sequence, at least part of side information related to positioning.

In some example embodiments, the side information may comprise at least one of an identification or a margin of a timing error group associated with the detected reference signal sequence.

In some example embodiments, the apparatus may further comprise means for causing the association of the reference signal sequence and the at least one of the identification or the margin of the timing error group.

In some example embodiments, the means for causing the association may comprise: means for receiving, from the first device, a request for associations of the plurality of available reference signal sequences and a plurality of available identifications of timing error groups, the plurality of available identifications of timing error groups comprising the identification of the timing error group; and means for in response to receiving the request, causing the associations of the plurality of available reference signal sequences and the plurality of available identifications of timing error groups.

In some example embodiments, the means for receiving the request for the associations may comprise: means for receiving, from the first device, an indication of the plurality of available identifications of timing error groups to request for reference signal sequences associated with respective ones of the plurality of available identifications of timing error groups.

In some example embodiments, the means for causing the associations of the plurality of available reference signal sequences and the plurality of available identifications of timing error groups comprises: means for in response to receiving the indication of the plurality of available identifications of timing error groups, generating the associations of the plurality of available reference signal sequences and the plurality of available identifications of timing error groups; and means for transmitting, to the first device, an indication of the generated associations.

In some example embodiments, the means for causing the associations of the plurality of available reference signal sequences and the plurality of available identifications of timing error groups may comprise: means for in response to receiving the indication of the plurality of available identifications of timing error groups, transmitting, to the first device, a plurality of root indexes to generate reference signal sequences for the plurality of available identifications of timing error groups.

In some example embodiments, the means for causing the associations of the plurality of available reference signal sequences and the plurality of available identifications of timing error groups may comprise: means for transmitting, to the first device, an instruction to generate the associations.

In some example embodiments, the apparatus may further comprise means for receiving, from the first device, a report of the associations of the plurality of available reference signal sequences and the of available identifications of timing error groups.

In some example embodiments, the side information may comprise a configuration of a plurality of configurations to be used to receive a subsequent reference signal, and the plurality of configurations comprise at least one of different periodicities, bandwidths, transmit powers, or time and/or frequency resources.

In some example embodiments, the apparatus may further comprise means for transmitting, to the first device, an indication of the plurality of configurations.

In some example embodiments, the reference signal may be received in a first configuration of the plurality of configurations to indicate a second configuration of the plurality of configurations to be used for the subsequent reference signal, the first configuration may comprise a first periodicity, and the second configuration may comprise a different second periodicity.

In some example embodiments, the second periodicity may be shorter than the first periodicity. The apparatus may further comprise: means for receiving, from the first device, the subsequent reference signal in the second periodicity before a next transmission occasion associated with the first configuration.

In some example embodiments, the side information may comprise skipping of a number of subsequent transmission occasions for a reference signal.

In some example embodiments, the apparatus may further comprise means for transmitting an indication of the number to the first device.

In some example embodiments, the reference signal sequence may be selected based on at least one of a mobility state, a power-saving state, a RRC connection state or a battery state of the first device. The apparatus may further comprise means for determining, based on the side information, the at least one of the mobility state or the power-saving state of the first device; and means for transmitting, to a third device for the positioning, an indication of the at least one of the mobility state, the power-saving state, the RRC connection state or the battery state of the first device.

In some example embodiments, the apparatus may further comprise means for transmitting, to the first device, an indication of the plurality of available reference signal sequences.

In some example embodiments, the plurality of available reference signal sequences may be configured for a reference signal resource.

In some example embodiments, the reference signal sequence may comprise a sounding reference signal sequence.

In some example embodiments, the side information may be determined at least in part by the first device, and the side information may comprise additional information associated with at least one of: determined hardware or software processing latencies and/or delays of the first device, or energy or capability constraints of the first device.

In some example embodiments, an apparatus capable of performing the method 1000 (for example, the third device 320 as shown in FIG. 3) may comprise means for performing the respective steps of the method 1000. The means may be implemented in any suitable form. For example, the means may be implemented in a circuitry or software module.

In some example embodiments, the apparatus comprises means for receiving a report from a first device for associations of a plurality of available reference signal sequences and a plurality of available identifications of timing error groups; and means for maintaining mapping between the plurality of available reference signal sequences, the plurality of available identifications of timing error groups and a plurality of margins of timing error groups.

In some example embodiments, the apparatus may further comprise means for receiving, from a second device, a first measurement of a reference signal and at least one of a reference signal sequence of the plurality of available reference signal sequences or an identification of the plurality of available identifications of timing error groups, the reference signal sequence being used to generate the reference signal; means for determining a margin of the plurality of margins of timing error groups associated with the at least one of the reference signal sequence or the identification;

and means for determining a position of the first device based on at least the first measurement of the reference signal and the margin of the plurality of margins of timing error groups.

In some example embodiments, the apparatus may further comprise means for sending, to a fourth device, an indication of the associations of the plurality of available reference signal sequences and the plurality of available identifications of timing error groups; and means for receiving, from the fourth device, a second measurement of the reference signal and at least one of the reference signal sequence or the identification, wherein the position of the first device is determined further based on the second measurement.

In some example embodiments, the apparatus may further comprise means for receive, from the second device, an indication of at least one of a mobility state, a power-saving state, a RRC connection state or a battery state of the first device. The position of the first device may be determined further based on the at least one of the mobility state, the power-saving state, the RRC connection state or the battery state of the first device.

Figure 11:
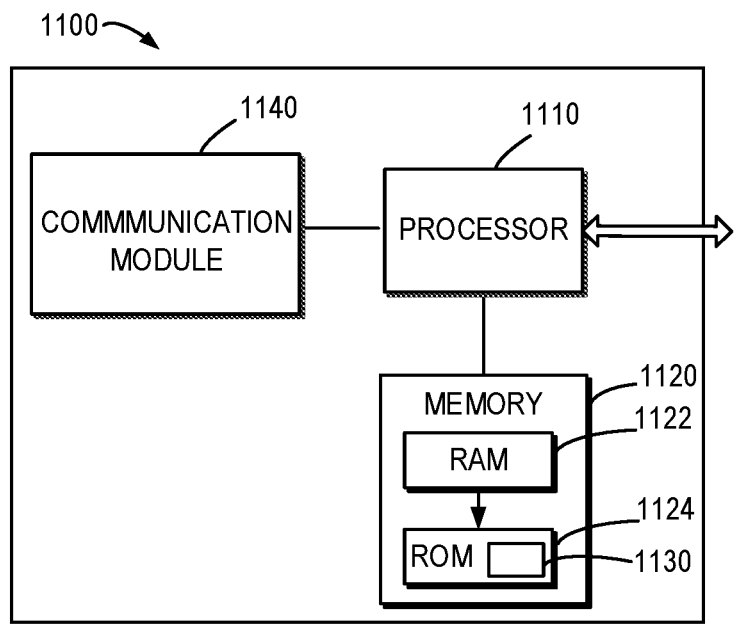
FIG. 11 illustrates a simplified block diagram of an apparatus that is suitable for implementing example embodiments of the present disclosure.

FIG. 11 is a simplified block diagram of a device 1100 that is suitable for implementing example embodiments of the present disclosure. The device 1100 may be provided to implement the communication device, for example the first device 210, the second device 230 or the third device 320 as shown in FIGS. 2 and 3. As shown, the device 1100 includes one or more processors 1110, one or more memories 1120 coupled to the processor 1110, and one or more communication modules 1140 coupled to the processor 1110.

The communication module 1140 is for bidirectional communications. The communication module 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the memory, e.g., ROM 1124. The processor 1110 may perform any suitable actions and processing by loading the program 1130 into the RAM 1122.

The example embodiments of the present disclosure may be implemented by means of the program 1130 so that the device 1100 may perform any process of the disclosure as discussed with reference to FIGS. 1 to 10. The example embodiments of the present disclosure may also be implemented by hardware or by a combination of software and hardware.

Figure 12:
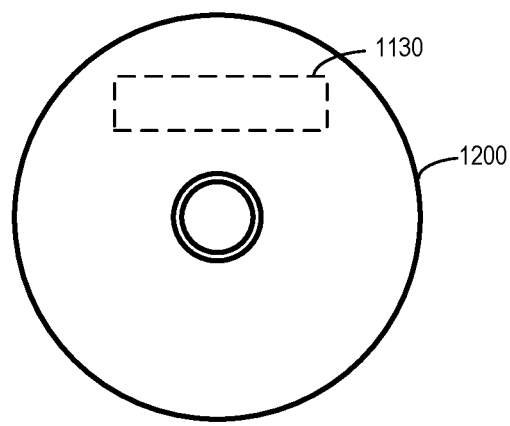
FIG. 12 illustrates a block diagram of an example computer readable medium in accordance with some example embodiments of the present disclosure.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium 1200 has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 800 to 1000 as described above with reference to FIGS. 1-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
    at least one processor; and
    at least one memory storing instructions that, when executed by the at least one processor, cause the first device at least to:
        select a reference signal sequence from a plurality of available reference signal sequences;
        generate, based on the selected reference signal sequence, a reference signal for positioning; and
        transmit, to a second device, the generated reference signal to indicate, with the selection of the reference signal sequence, at least part of side information related to the positioning;
    wherein the side information comprises at least one of an identification or a margin of a timing error group associated with the selected reference signal sequence;
    wherein the first device is further caused to:
        prior to the selecting, cause the association of the reference signal sequence and the at least one of the identification or the margin of the timing error group;
    wherein the first device is caused to cause the association by:
        requesting the second device for associations of the plurality of available reference signal sequences and a plurality of available identifications of timing error groups, the plurality of available identifications of timing error groups comprising the identification of the timing error group, and wherein the first device is caused to request the second device for the associations by:
        sending, to the second device, an indication of the plurality of available identifications of timing error groups to request for reference signal sequences associated with respective ones of the plurality of available identifications of timing error groups.

2. A first device, comprising:
    at least one processor; and
    at least one memory storing instructions that, when executed by the at least one processor, cause the first device at least to:
        select a reference signal sequence from a plurality of available reference signal sequences;
        generate, based on the selected reference signal sequence, a reference signal for positioning; and
        transmit, to a second device, the generated reference signal to indicate, with the selection of the reference signal sequence, at least part of side information related to the positioning;
    wherein the side information comprises at least one of an identification or a margin of a timing error group associated with the selected reference signal sequence;
    wherein the first device is further caused to:
        prior to the selecting, cause the association of the reference signal sequence and the at least one of the identification or the margin of the timing error group; and
    wherein the first device is further caused to cause the association by:
        generating associations of the plurality of available reference signal sequences and a plurality of available identifications of timing error groups, the plurality of available identifications of timing error groups comprising the identification of the timing error group.

3. A first device, comprising:
    at least one processor; and
    at least one memory storing instructions that, when executed by the at least one processor, cause the first device at least to:
        select a reference signal sequence from a plurality of available reference signal sequences;
        generate, based on the selected reference signal sequence, a reference signal for positioning; and
        transmit, to a second device, the generated reference signal to indicate, with the selection of the reference signal sequence, at least part of side information related to the positioning;
    wherein the side information comprises at least one of an identification or a margin of a timing error group associated with the selected reference signal sequence;
    wherein the first device is further caused to:
        determine the number of the available reference signal sequences and a margin offset for a plurality of available identifications of timing error groups, the plurality of available identifications of timing error groups comprising the identification of the timing error group; and
        associate, based on the number of the available reference signal sequences and the margin offset, the plurality of available identifications of timing error groups with a plurality of margins of timing error groups, the plurality of margins of timing error groups comprising the margin of the timing error group.

* * * * *